United States Patent
Gabbianelli et al.

(10) Patent No.: US 6,824,204 B2
(45) Date of Patent: Nov. 30, 2004

(54) HYBRID SPACE FRAME FOR MOTOR VEHICLE

(75) Inventors: Gianfranco Gabbianelli, Troy, MI (US); Richard Ashley, Gaylord, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 10/469,343

(22) PCT Filed: Mar. 1, 2002

(86) PCT No.: PCT/US02/06051

§ 371 (c)(1),
(2), (4) Date: Aug. 28, 2003

(87) PCT Pub. No.: WO02/070322

PCT Pub. Date: Sep. 12, 2002

(65) Prior Publication Data

US 2004/0140693 A1 Jul. 22, 2004

Related U.S. Application Data

(60) Provisional application No. 60/272,468, filed on Mar. 2, 2001.

(51) Int. Cl.[7] ............................................... B62D 25/00
(52) U.S. Cl. ................................ 296/205; 296/193.06
(58) Field of Search ........................... 296/193.06, 204, 296/205

(56) References Cited

U.S. PATENT DOCUMENTS

| | | | |
|---|---|---|---|
| 2,108,215 A | 2/1938 | Stief et al. | |
| 4,618,163 A | 10/1986 | Hasler et al. | |
| 5,308,115 A | 5/1994 | Ruehl et al. | |
| 5,332,281 A | 7/1994 | Janotik et al. | |
| 5,549,352 A | * 8/1996 | Janotik et al. | 296/205 |
| 5,580,121 A | 12/1996 | Dange et al. | |
| 5,688,021 A | 11/1997 | Tomforde et al. | |
| 5,855,394 A | 1/1999 | Horton et al. | |
| 5,862,877 A | 1/1999 | Horton et al. | |
| 5,882,039 A | 3/1999 | Beckman et al. | |
| 5,882,064 A | 3/1999 | Emmons | |
| 6,092,865 A | 7/2000 | Jaekel et al. | |
| 6,099,039 A | 8/2000 | Hine | |
| 6,193,273 B1 | 2/2001 | Novak et al. | |
| 6,209,914 B1 | 4/2001 | Grieser et al. | |
| 6,273,498 B1 | 8/2001 | Hillman et al. | |
| 6,282,790 B1 | * 9/2001 | Jaekel et al. | 296/205 |
| 6,283,539 B1 | 9/2001 | Enning et al. | |
| 6,293,617 B1 | 9/2001 | Sukegawa | |
| 6,412,857 B2 | * 7/2002 | Jaekel et al. | 296/205 |
| 6,533,348 B1 | * 3/2003 | Jaekel et al. | 296/205 |
| 2001/0002760 A1 | * 6/2001 | Gabbianelli et al. | 296/205 |

* cited by examiner

Primary Examiner—Jason Morrow
(74) Attorney, Agent, or Firm—Pillsbury Winthrop LLP

(57) ABSTRACT

A space frame for an motor vehicle having hydroformed upper and lower longitudinal members and hydroformed cross-members. Each upper longitudinal member is connected to a corresponding lower longitudinal member in the front and at the rear of the frame by members formed of stamped sheet metal. The stamped components can form part of the front and rear wheel wells. The use of stamped members to connect hydroformed members can permit the use of hydroformed members in motor vehicles with minimum amounts of space for frame members.

27 Claims, 26 Drawing Sheets

HYBRID SPACE FRAME FOR MOTOR VEHICLE

This application is the National Phase of International Application PCT/US02/06051 filed Mar. 1, 2002 which designated the U.S. and that International Application was published in English under PCT Article 21(2) on Sep. 12, 2002 as International Publication Number WO 02/070322A1. PCT/US02/06051 claims priority to U.S. Provisional Application No. 60/272,468, filed Mar. 2, 2001. The entire contents of these applications are incorporated herein by reference.

FIELD OF THE INVENTION

The present invention is generally related to motor vehicle frames and more particularly to motor vehicle space frames constructed using hydroformed members.

BACKGROUND OF THE INVENTION

Tubular hydroforming is increasingly used in vehicle frame construction because tubular hydroforming offers automobile manufacturers many commercial advantages. The use of tubular hydroforming enables manufacturers to better control frame stiffness, dimensional stability, fatigue in life, and vehicle crashworthiness over prior vehicle designs while reducing frame mass and cost. Hydroforming is a metal-forming process in which high-pressure fluid is used to outwardly expand a tubular metal blank into conformity with the surfaces of a die cavity of a die assembly to form an irregularly shaped tubular part. Hydroformed members can be provided with a wide range of geometries in comparison with other methods of forming parts. Each hydroformed frame member can be constructed to have a cross-sectional configuration that varies continuously along its length, to the configuration desired and each frame member can be constructed to curve or "bend" along its length to define different frame parts such as frame side rails and frame pillars.

Depending on specific circumstances, certain "sharp" bends may not be advantageous or possible due to particular space constraints for certain motor vehicle designs. Space frames are cage-like structures on which other vehicle components, including the engine, drive train, suspension and the hang-on vehicle body parts, can be mounted. Tubular hydroformed space frames may be used in the construction of relatively large vehicles such as sports utility vehicles and larger sedans and trucks. In relatively larger frame vehicles, angular limitations on the construction on tubular hydroformed members generally pose few problems. However, the limited space available in some motor vehicles such as compact or other smaller frame cars can limit the use of hydroformed space frames therein. This is especially true when the motor vehicle has set interior and exterior configurations and the frame must be fit between the two.

There is a need for a vehicle space frame that can provide the benefits of tubular hydroformed construction for smaller frame vehicles with limited frame space.

SUMMARY OF THE INVENTION

To meet the needs expressed above, the present invention provides space frame for a motor vehicle that includes a pair of tubular, hydroformed longitudinally extending lower side rail members and a pair of tubular, hydroformed upper longitudinal members. Each of the upper longitudinal members includes a rear pillar-forming portion and a rail-forming portion, each of the pillar-forming portions being coupled to an end of a respective one of the lower side rail members and extending upwardly therefrom to define a rearward-most pillar of the motor vehicle and each of the rail-forming portions extending forwardly from the pillar-forming portion to define a roof support rail of the motor vehicle. The space frame further includes a pair of forward-most pillar assemblies, each of the pair of forward-most pillar assemblies being coupled to a respective one of the pair of lower side rail members and extending upwardly therefrom and being coupling with a respective one of the upper longitudinal members, and each of the forward-most pillar assemblies being formed from stamped sheet metal. A laterally extending connecting structure is mounted between the pair of lower side rail members, the connecting structure being constructed and arranged to hold the pair of lower side rail members in laterally spaced relation to one another.

The invention further provides space frame for a motor vehicle comprising a pair of tubular, hydroformed longitudinally extending lower side rail members and a pair of tubular hydroformed upper longitudinal members. Each of the upper longitudinal members includes a rear pillar-forming portion and a rail-forming portion, each pillar-forming portion being coupled to an end of a respective one of the lower side rail members and extending upwardly therefrom to define a rearward-most pillar of the motor vehicle and each of the rail-forming portions extending forwardly from the rear pillar-forming portion to define a roof support rail of the motor vehicle. The space frame further includes pair of pillar support structures, each pillar support structure being of stamped sheet metal construction and each being connected to a respective lower side rail member at the location to support a forward-most pillar structure. The space frame also includes a pair of forward-most pillar structures, each pillar structure being coupled at a lower end thereof to an associated pillar support structure and being coupled at an upper end thereof to an associated upper longitudinal member. A laterally extending connecting structure is mounted between the pair of lower side rail members, the connecting structure being constructed and arranged to hold the pair of lower side rail members in laterally spaced relation to one another.

Other objects, features, and advantages of the present invention will become apparent from the following detailed description, the accompanying drawings, and the appended claims.

BRIEF DESCRIPTION OF THE DRAWINGS

FIG. 1 illustrates an embodiment of the present invention including a lower frame assembly of the space frame in isolation;

FIG. 2 shows the lower frame assembly of FIG. 1 with various body panels secured thereto;

FIG. 3 shows the frame assembly of FIG. 2 with an upper frame assembly mounted thereto;

FIG. 4 shows the space frame of FIG. 3 with additional body panels structures mounted thereto;

DETAILED DESCRIPTION OF THE INVENTION

FIGS. 1–4 show various stages of assembly of an illustrated embodiment of the invention in the form of a motor vehicle space frame. The space frame 10 is generally illustrated with a plurality of body panels mounted thereto. Vehicle space frames for any size vehicle may be constructed utilizing the principles of vehicle construction taught by the illustrated embodiment. The space frame 10 is particularly well-suited for the construction of a compact, sub-compact, or smaller commercial motor vehicles (generally referred to as "smaller frame vehicles" in the present application). As will become apparent, the space frame 10 utilizes a significant amount of tubular hydroformed construction to allow the vehicle manufacturer to have the advantage of the benefits offered by tubular hydroformed technology (such as reduction of frame weight without compromising vehicle crashworthiness, reduction of the total number of frame parts and of the number of welds required for frame assembly, reduction in the amount of waste generated, and so on) and utilizes non-hydroforming construction, such as stamping, to optimize the amount of tubular hydroformed construction that can be incorporated into the smaller frame vehicle. These advantages will become apparent as the construction on the space frame 10 is considered in detail. Hydroformed space frames are generally known as in U.S. Pat. No. 6,092,865 to Jaekel et al., which is incorporated herein by reference, in its entirety.

Figure 1:
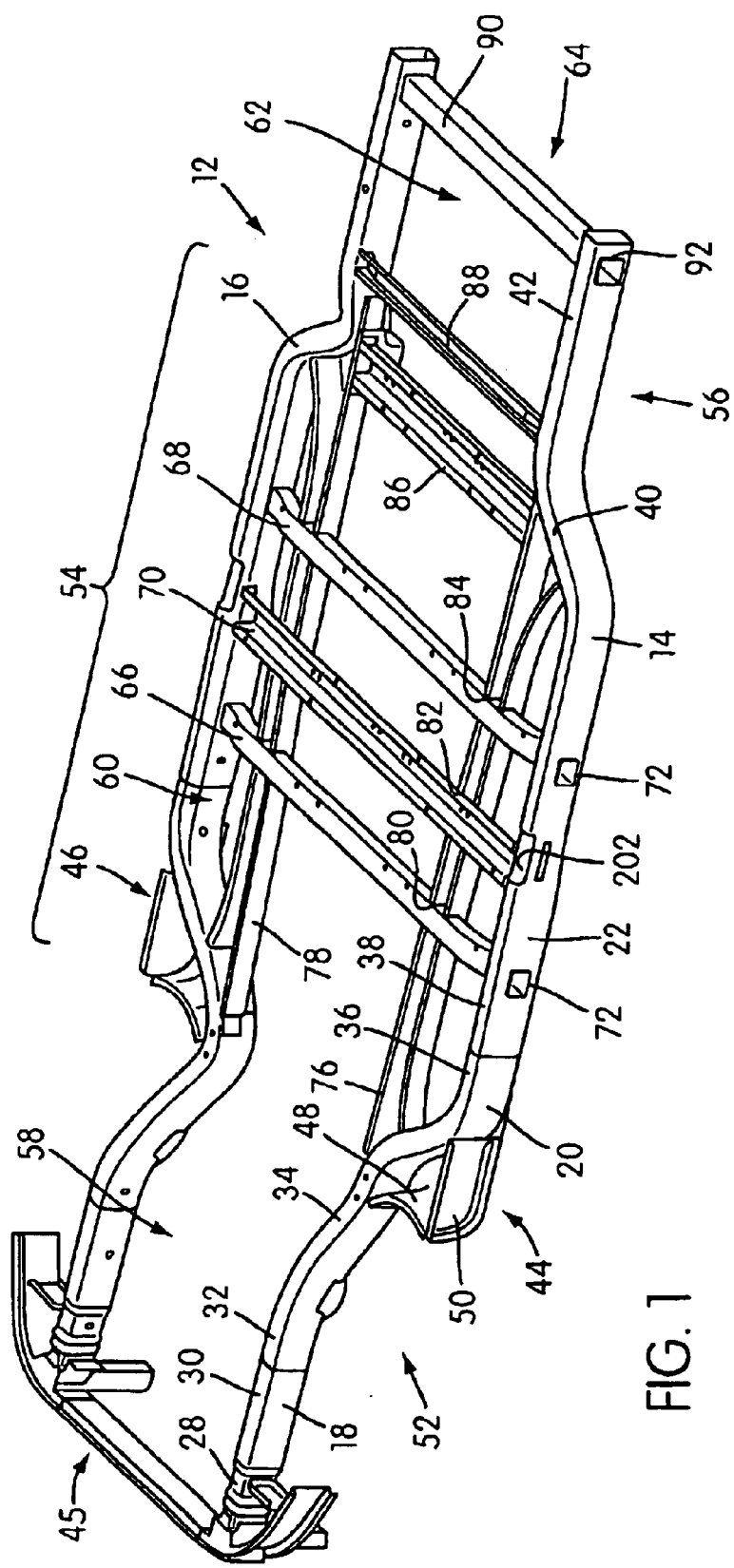
FIGS. 1–4 show various stages of assembly of an exemplary vehicle illustrating an embodiment of the invention, FIGS. 1–4 particularly showing the assembly of a space frame of the vehicle and showing various body panels mounted to the space frame.

FIG. 1 shows a lower frame assembly 12 of the space frame 10 in isolation. The lower frame assembly 12 includes a pair of longitudinally extending, laterally spaced lower side rail members 14, 16 of tubular hydroformed construction. Because the lower side rail members 14, 16 are of mirror image construction, only rail member 14 will be discussed in detail, but the discussion applies equally to rail member 16. Corresponding portions of rail members 14 and 16 are labeled with identical reference numbers in the present application to facilitate discussion of the invention, but it is understood that these corresponding portions are of mirror image construction.

Rail member 14 is of three-piece construction and includes a tubular hydroformed forward rail portion 18, a central rail portion 20 and a rearward portion 22. These portions 18, 20, 22 are telescopically interengaged and welded together at joints 24 and 26, respectively.

The forward portion 18 of rail member 14 includes a forward "crash tip" section 28 and a relatively straight, longitudinally extending rearward section 30. The central portion 20 of rail member 14 includes a relatively straight, longitudinally extending forward section 32, and generally outwardly angled (in the longitudinal front to rear vehicle direction) intermediate section 34 and a longitudinally extending, relatively straight rearward section 36. The rearward rail portion 22 includes a longitudinally extending, relatively straight forward section 38, an inwardly (in the longitudinal front to rear vehicle direction) angled intermediate section 40, and a longitudinally extending, relatively straight rearward section 42.

A bumper assembly 45, which can be of stamped sheet metal construction, is mounted on the forwardmost ends of the rail members 14, 16. The crash tip section 28 of rail member 14 is constructed and arranged to absorb impact in the event of a vehicle head on collision. A pillar support structure 44, 46, which can be of stamped sheet metal construction, is connected to the exterior surface of a rail member 14 or 16, respectively, by welding or other suitable method, generally in the area of transition between sections 34 and 36 thereof Because the pillar support structures 44, 46 are of mirror image construction, only structure 44 will be considered in detail, but the discussion applies equally to structure 46. Corresponding portions of the structures 44, 46 are labeled with identical reference numerals even though they are of mirror image construction. The pillar support structure 44 includes an inner support element 48 and an outer support element 50.

The forward sections 30, 32, 34 of the rail member 14 and the inner support element 48 of the support structure 44 generally define a front wheel well 52. The outer support element 50 on the support structure 44 and the straight longitudinally extending sections 36 and 38 of the rail member 14 generally define a rocker panel portion 54 of the lower frame assembly 12. The rearward sections 40 and 42 of the rail member 14 generally define a rear wheel well 56. The forward sections 30, 32, 34 of the rail members 14, 16 generally define an engine compartment area 58 of the lower frame assembly 12. Similarly, sections 36 and 38 of the rail members 14, 16 generally define a passenger compartment area 60 of the assembly 12 and sections 40 and 42 of the rail members 14, 16 generally define a rear cargo area 62 of the frame assembly 12.

A plurality of laterally extending connecting structures generally designated 64 are connected between the lower side rail members 14, 16 and are constructed and arranged to hold the same in laterally spaced fixed relation to one another. The connecting structure 64 includes a pair of first and second central connecting members 66, 68 (which have closed cross sections and which may be, for example, of hydroformed or roll formed construction) and third central connecting structure 70. The third connecting structure 70 has an open, essentially C-shaped cross section and may be of the stamped sheet metal construction. Opposite ends of the connecting members 66, 68 are secured to the rails 14, 16 at joints 72, 74, respectively. Joints 72 and 74 are essentially identical in construction and are formed by cutting holes in opposing walls of each of the rail members 14, 16 and securing opposite ends of the connecting members 66, 68 in respective pairs of openings by welding. The connecting member 70 is connected between the rail members 14, 16 by welding opposite ends of the member 70 to exterior surface portions of the respective rail members 14, 16.

A pair of the inwardly spaced, longitudinally extending rail members 76, 78 are connected between the angled sections 34, 40, respective, of the rail members 14, 16. Because the inner rail members 76, 78 are of mirror image construction only rail member 76 will be discussed in detail but the discussion applies equally to rail member 78. The rail member 76 is preferably of stamped, open cross section sheet metal construction and has an open, essentially C-shaped cross section. Preferably the rail member 76 is secured to the lower frame assembly 12 by welding opposite ends of the member 76 to inwardly facing exterior wall surfaces on sections 34 and 40, respectively, of the rail member 14. The laterally extending members 66, 68, 70 are secured by welding or by other suitable method in notches 80, 82, 84, respectively, formed in the longitudinally extending rail member 76.

The cross structure 64 further includes a pair of rearward connecting structures 86, 88. Each rearward connecting structure 86, 88 preferably has an open, essentially C-shaped cross section and is a sheet metal structure that has been shaped by stamping. The connecting structure 86 is secured to the frame assembly 12 by securing opposite ends thereof to inwardly facing exterior surfaces of the inner rail members 76, 78 by welding or other suitable method. The connecting structure 88 is secured to the frame assembly 12 by welding opposite ends thereof to inwardly facing exterior surfaces of opposing sections 42 of the rail members 14, 16. A rearward most connecting member 90 is secured between the rail members 14, 16 at joints 92. Preferably the connecting member 90 is of tubular construction (i.e., has a close cross-section) and may be formed by hydroforming, by roll forming or any other appropriate method. Joints 92 are similar in construction to joints 72 (see FIG. 15 for a cross sectional view of joint 92).

Figure 2:
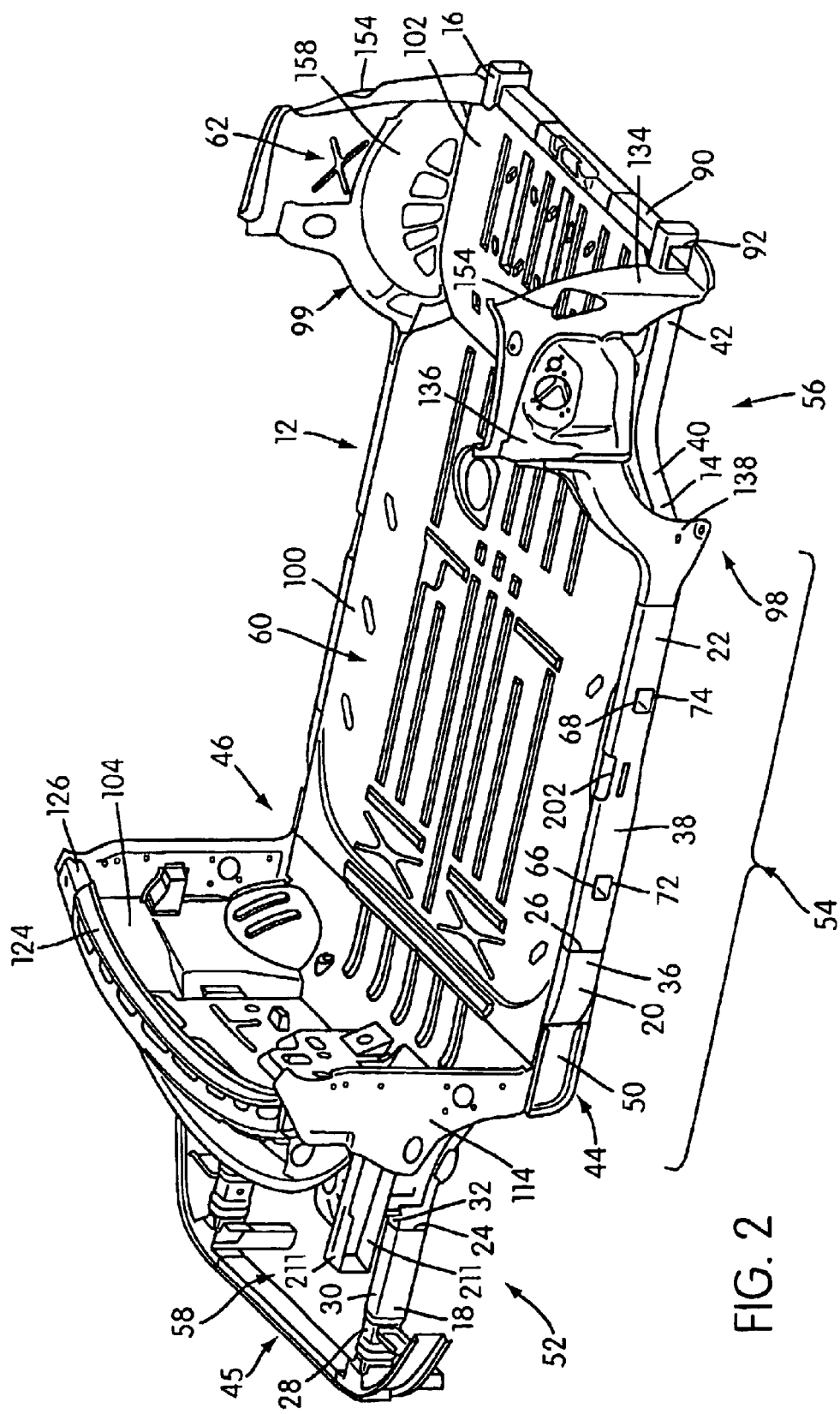
Figure 3:
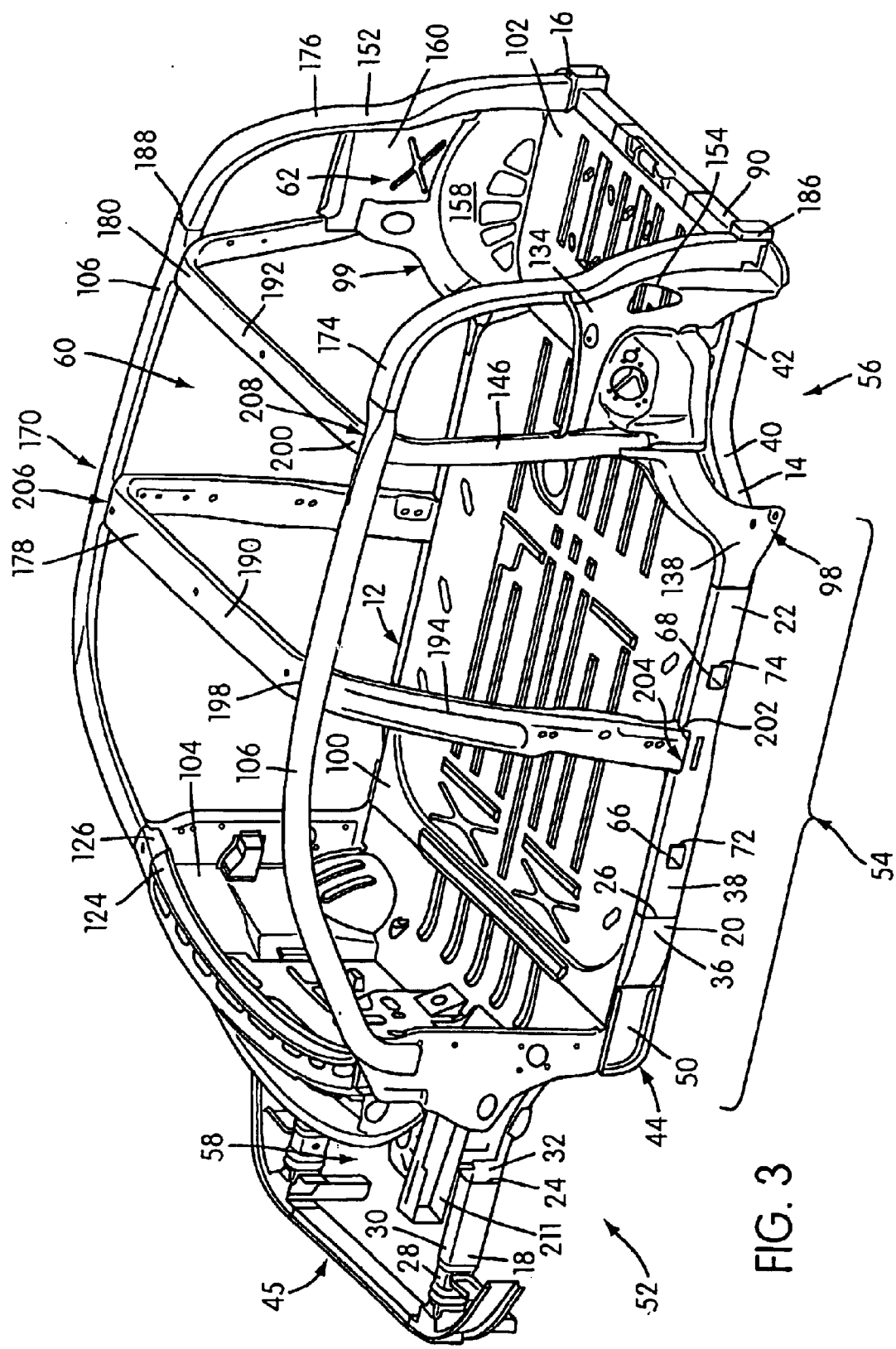
Figure 4:
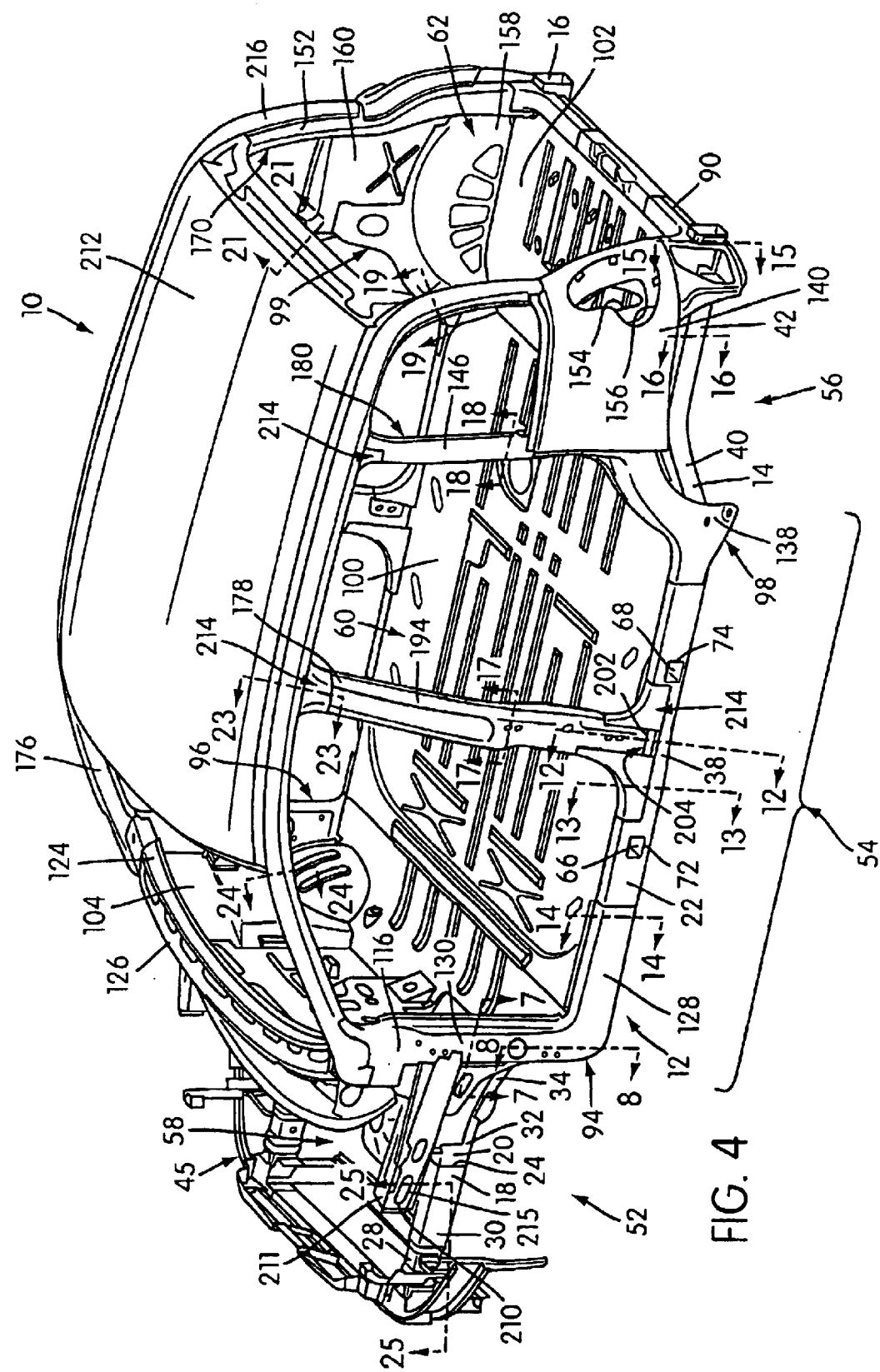

As shown in FIGS. 2–4, a plurality of the vehicle components, each can be formed from non-hydroforming methods such as of stamped, sheet metal construction, are secured to the lower frame assembly 12. These components include floor pan structures, a pair of forward-most pillar assemblies 94, 96 and a pair of rear pillar support assemblies 98, 99. More specifically, the central floor pan structure 100 is secured to intermediate portions of the rail members 14, 16 and to portions of the cross members 66, 68, 70 and 86, by welding or other appropriate method. A rear floor pan 102 is secured to rearward portions of the rail members 14, 16 and to cross members 88 and 90 by welding or other appropriate method. The floor pans 100, 102 can be of stamped sheet metal construction and provide the floor structure for the passenger compartment 60 and the cargo compartment 62, respectively.

A lower portion of a dash panel 104, which can be of stamped sheet metal construction, is welded to the lower frame assembly 12 at the forward end of the passenger compartment area 60. The dash panel 104 supports various vehicle structures in the assembled vehicle including an instrument panel (not shown), a lower portion of a vehicle windshield (not shown) and various vehicle controls and also functions as a firewall between the passenger and engine compartments.

Figure 6:
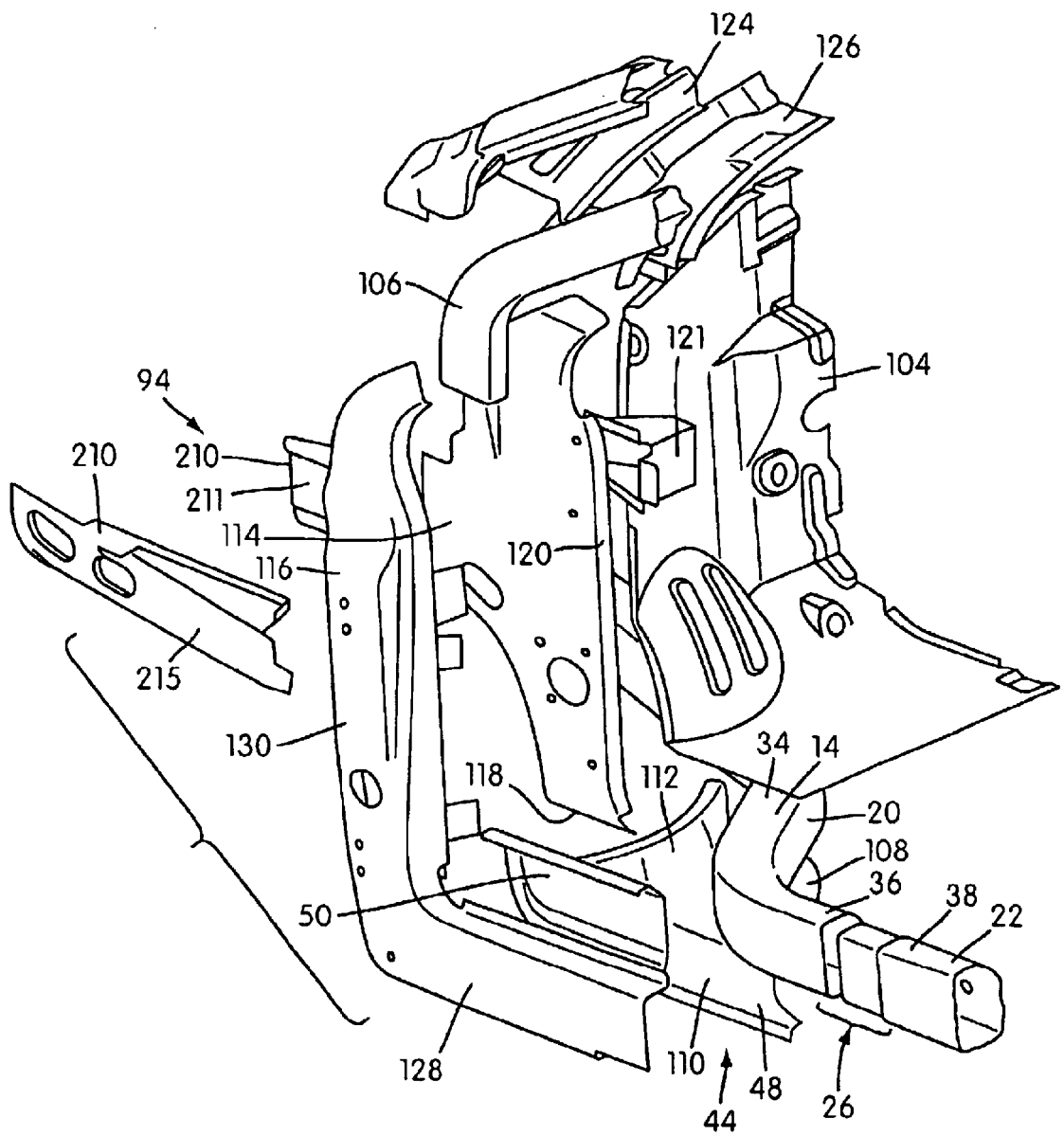
FIG. 6 is an exploded view of a forward-most pillar assembly of the space frame of FIGS. 1–4.
Figure 7:
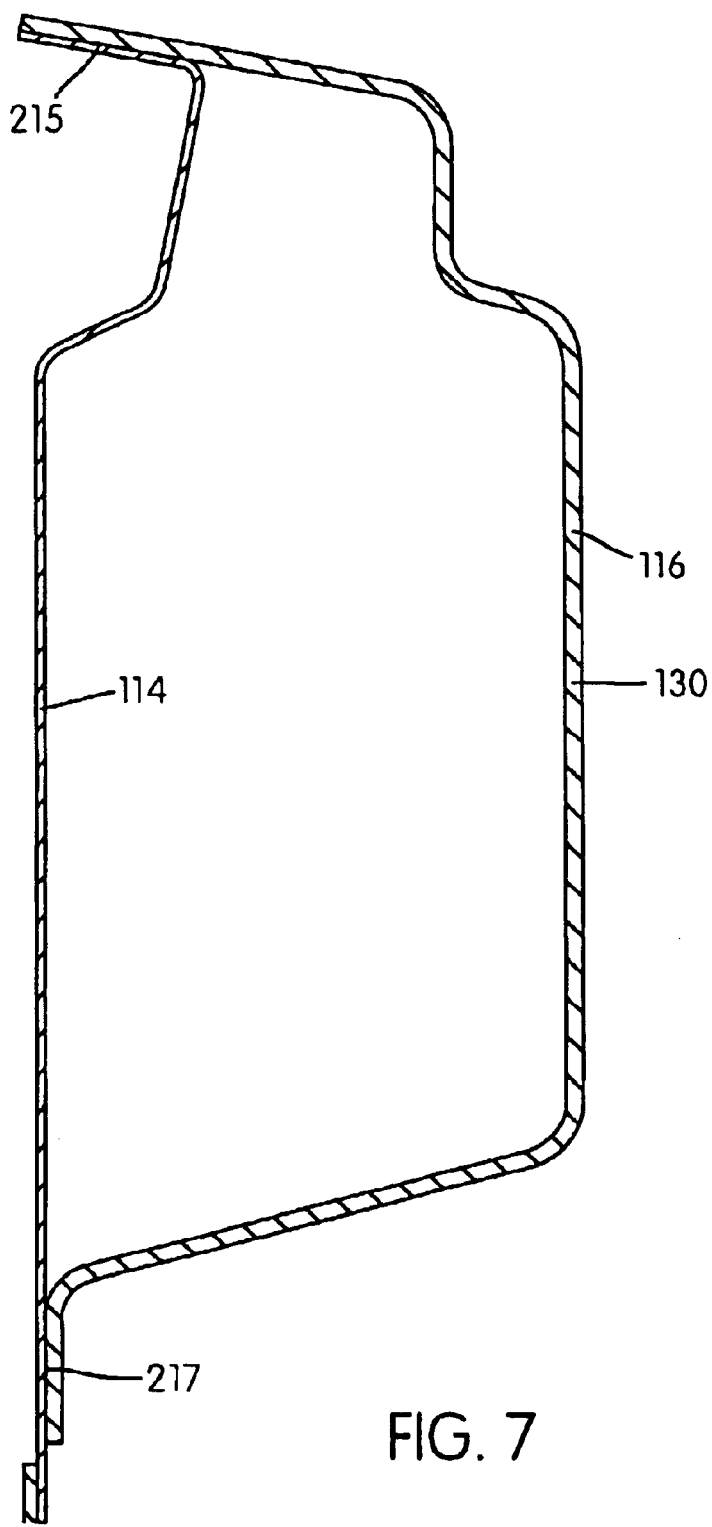
FIG. 7 is a cross sectional view taken through the 7—7 as indicated in FIG. 4.
Figure 8:
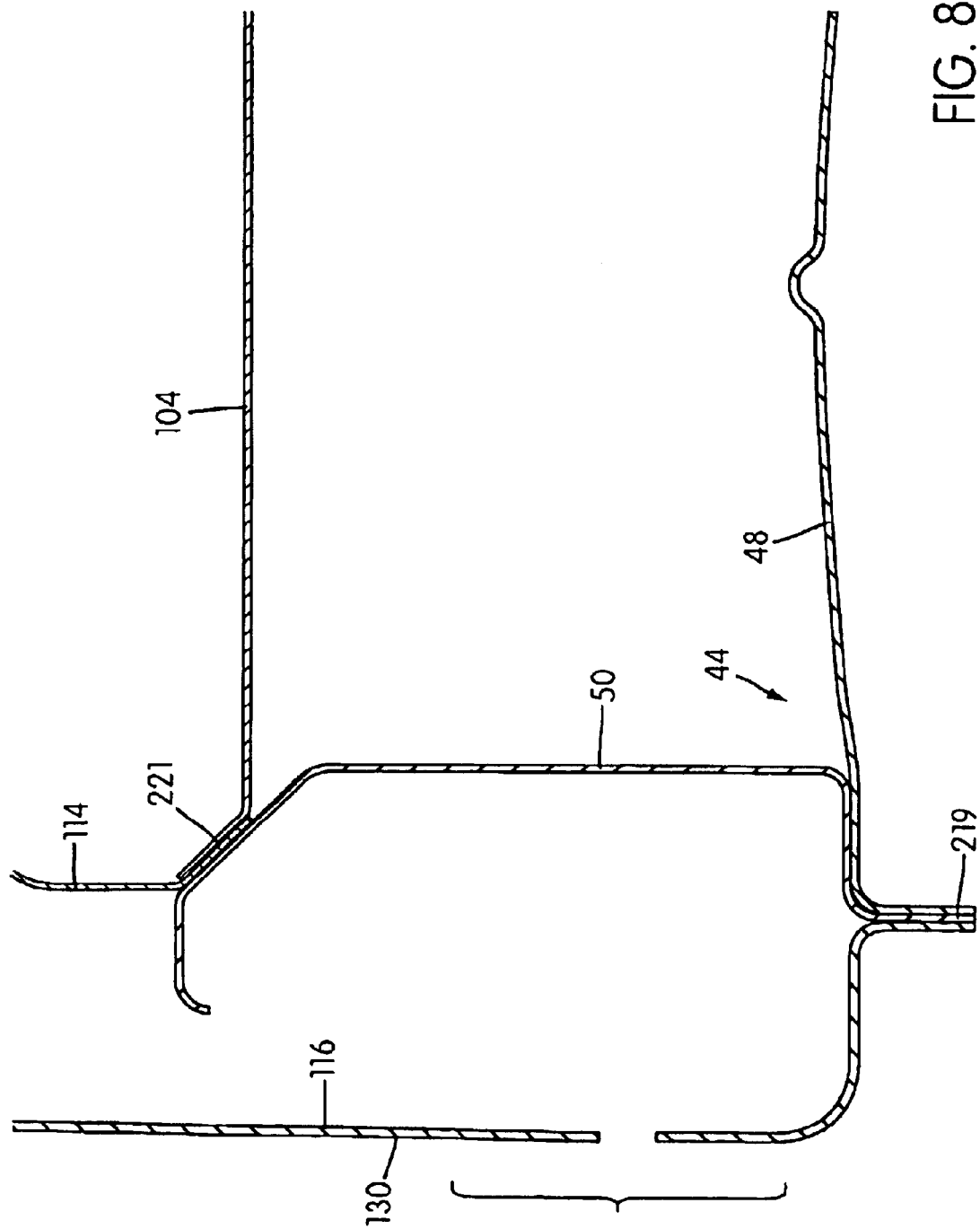
FIG. 8 is a cross sectional view taken through the 8—8 as indicated in FIG. 4.

The construction of the forward-most pillar assembly 94 and the manner in which the pillar assembly 94, the side rail member 14, the pillar support structure 44 and the dash panel 104 are interconnected can be appreciated from FIGS. 6–8. The pillar assemblies 94, 96 part of mirror image construction. Only assembly 94 will be discussed in detail, but the discussion applies equally to the assembly 96.

The forward-most pillar assembly 94 is a multi-piece assembly of stamped sheet metal structures that provides the space frame 10 with a forward-most or A pillar and provides support and attachment structure for a hydroformed roof rail 106 (shown in fragmentary view, for example, in FIG. 6) of the tubular hydroformed upper frame assembly described below. The construction of the pillar assembly 94 is best understood from the exploded view of FIG. 6. FIG. 6 shows in fragmentary view the central portion 20 of the rail member 14 in exploded relation with the rearward portion 20 to thereof. The telescopic nature of the inter-engagement of joint 26 can be appreciated from the exploded view of FIG. 6. An outer edge 108 of a lower, essentially horizontally extending wall portion 110 of the inner support element 48 of the pillar support structure 44 is welded to a downwardly facing surface of the rail member 14 generally in the vicinity of transition between a rocker panel-forming section 36 of the rail member 14 and the angled section 34 of the rail member 14. An essentially vertical wall portion 112 of the inner support element 48 of the pillar support structure 44 defines the rearward extent of the front wheel well 52. The outer support element 50 of the pillar support structure 44 is secured to the inner support element 48 preferably by welding to form a box-like support structure generally between the rocker panel portion of the side rail member 14 (i.e., sections 36 and 38 thereof) and the front wheel well to support the forward-most pillar assembly 98. The outer element 50 provides a forward portion of the rocker panel 54. The support structure 44 provides a support for inner and outer pillar members 114, 116, respectively, of the pillar assembly 98. The inner and outer pillar members 114, 116 provide a pillar structure for the space frame 10 the defines the A pillar. The inner and outer pillar members 114, 116 thus form the vehicle A pillar and provide attachment structure for the tubular hydroformed roof rail 106 to the A pillar.

The inner and outer pillar members 114, 116 can be stamped sheet metal structures that are preferably secured to one another and to the surrounding stamped sheet metal and tubular hydroformed components by welding, although any appropriate method can be used to secure these structures to one another.

A lower portion 118 of the inner pillar 114 is welded within the box-like pillar support structure 44 (see the cross section of FIG. 8). An intermediate portion 120 of the inner pillar member 114 is secured to an edge of the dash panel 104. A reinforcement structure 121, can be of stamped sheet metal construction and may be welded in reinforcing relation between the dash panel 104 and the inner pillar member 114. An upper portion 122 of the inner pillar member 114 is secured to an upper edge of the dash panel 104 and to upper and lower plenum structures 124, 126, respectively.

A lower portion 128 of the outer pillar member 116 is secured to the exterior of the outer support element 50 of the pillar support structure 44 and to a portion of the side rail member 14 and an upper portion 130 of the outer pillar member 116 is secured to the inner pillar member 114 in the assembled vehicle space frame 10. The roof rail portion 106 of a tubular hydroformed member is generally secured therebetween. FIG. 2 shows the pillar support member 44, the inner pillar member 114, the dash panel 104 and the upper and lower plenum structures 124, 126 mounted on the lower frame assembly 12.

FIG. 2 also shows the pillar support assemblies 98, 99 mounted on the lower frame assembly 12. The pillar support assemblies 98, 99 are of similar construction and may be of mirror image construction. The structure of pillar support assembly 98 is considered in detail and the construction of pillar support assembly 99 is briefly discussed and can be understood from the discussion of assembly 98.

Figure 9:
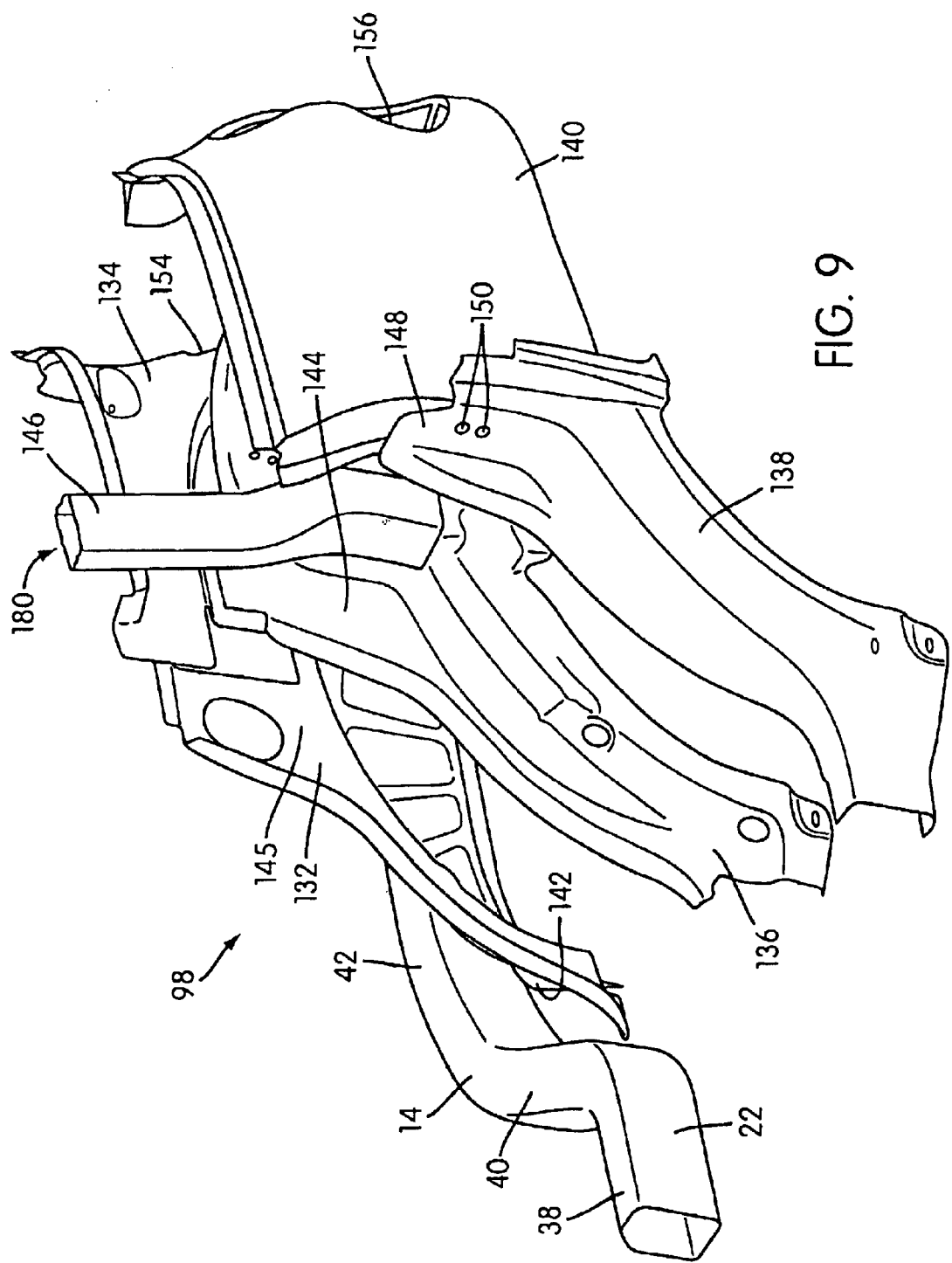
FIG. 9 is an exploded view of a pillar support structure of the space frame of FIGS. 1–4.

The pillar support assembly 98 is shown in exploded view in FIG. 9. FIG. 9 shows the portion of the rail member 14 that defines the rear wheel well 56 in fragmentary view. The pillar support assembly 98 includes a rear wheel house structure 132, a rear quarter panel inner structure 134, an inner pillar support structure 136, an outer pillar support structure 138 and an outer rear quarter panel structure 140.

A lower edge 142 of the rear wheel house structure 132 is welded to sections 40 and 42 of the rail member 14. A lower portion of the rear wheel house structure 132 defines a portion of the rear wheel well 56. The rear quarter panel inner structure 134 is secured to the wheel house structure 132 and to a rearward portion of the rail member 14 (see, for example, FIG. 2), preferably by welding. The inner pillar support structure 136 is secured to the rail member 14, the rear wheel house structure 132 and to the rear quarter panel inner structure 134, preferably by welding. As shown, for example, in FIG. 4, the inner pillar support structure 136 includes support structure 144, which can be shaped by stamping, to receive a lower end portion of the tubular hydroformed member 146 (shown in fragmentary view in FIG. 9) that provides a C pillar for the space frame 10. The outer pillar support structure 138 is secured to a portion of the rail member 14 and to a portion of the inner pillar support structure 136, preferably by welding. The outer pillar support structure 138 includes stamped structure 148 that is constructed and arrange to support the tubular hydroformed C pillar 146. Structures 134, 136, and 138 can all be made of non-hydroforming methods, such as stamped sheet metal construction.

Optionally, a pair of weld openings 150 may be provided in the outer pillar support structure 138 to help secure the C pillar 146 to the support structure 138. The outer rear quarter panel structure 140 is welded to portions of the inner and outer pillar support structures 136, 138, to the rear quarter panel inner structure 134, to the C pillar 146 and to the adjacent D pillar 152 (see, for example, FIG. 4). It can also be appreciated from FIG. 4 that the rear quarter panel inner and outer structures 134, 140 are each provided with openings 154, 156 to accommodate vehicle tail lights.

Figure 10:
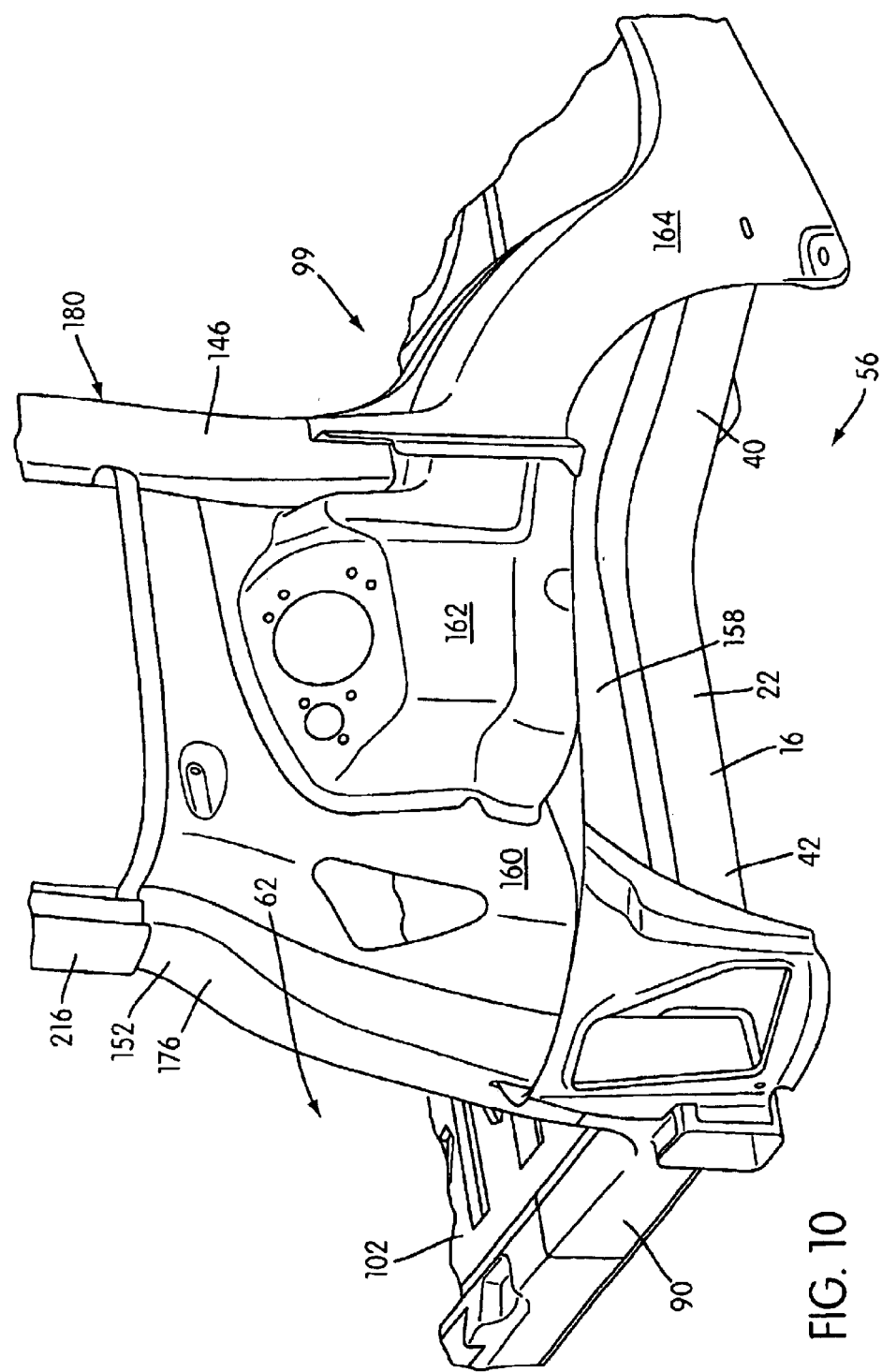
FIG. 10 is an assembled view of a pillar support structure on of the space frames of FIGS. 1–4.

The partially assembled pillar support assembly 99 is shown in enlarged view in FIG. 10. The pillar support assembly 99 includes a rear wheel house structure 158, a rear quarter panel inner structure 160, an inner pillar support structure 162 and an outer pillar support structure 164. As shown in FIG. 10, the inner and outer pillar support structures 162, 164 cooperate to receive and support a lower portion of a C pillar 146 of the space frame 10. A portion of the rear quarter panel inner structure 160 is connected to the rear pillar 152, to the inner pillar support structure 162 and to the C pillar 146 which helps hold the C pillar 146 rigidly in place.

It can be appreciated from a comparison of FIGS. 2–4 that the space frame 10 may be constructed by mounting the floor pans 100, 102, the dash panel 104, the pillar support structures 44, 46 the inner pillar members 114, the upper and lower plenum structures 124, 126, the rear wheel house structures 132, 158, the rear quarter panel inner structures 134, 160, the inner pillar support structures 136, 162 and the outer pillar support structures 138, 164 to the lower frame assembly 12 (as shown in FIG. 2).

At this point in the construction, a tubular hydroformed upper frame assembly generally designated 170 may be mounted on the vehicle frame. The upper frame assembly 170 includes a pair of tubular hydroformed upper longitudinal members 174, 176, a first tubular hydroformed U-shaped member 178 and a second tubular hydroformed U-shaped member 180.

The upper longitudinal members 174, 176 are of mirror image construction so only upper longitudinal member 174 will be discussed in detail, but the discussion applies equally to member 176. Each of the longitudinal members 174 includes a D pillar forming portion 152 and a roof rail forming portion 106. The pillar forming portion 152 of the upper longitudinal member 174 is connected at a free end to the side rail member 14 at joint 186 and extends upwardly therefrom to define the rearward most or D pillar of the space frame 10. The rail forming portion 106 of the upper longitudinal member 174 extends forwardly from the pillar forming portion 152 thereof to define the roof rail of the space frame 10. The upper longitudinal member 174 is preferably hydroformed from a single tubular blank that includes a butt weld 188. It is preferred to construct the upper longitudinal member 174 in one hydroforming operating to minimize stacked tolerances in the longitudinal vehicle direction.

The first and second U-shaped members 178, 180 can both be of one-piece, tubular hydroformed construction. Members 178 and 180 each include cross portions 190, 192, respectively, and a pair of legs 194, 146, respectively, that extends integrally from junctures 198, 200, respectively, at opposite ends of the respective cross portions 190, 192.

The free end of each leg 194 of the first U-shaped member 190 is secured within an upwardly facing opening 202 formed in the respective rail members 14, 16 to form joints 204. The roof rail 106 is welded in surface-to-surface relation to the cross member 190 at the juncture 198 thereof to form a joint 206. The legs 194 of the first U-shaped cross member 190 define a pair of B pillars of the space frame 10.

Similarly, the roof rail 106 is welded in overlying surface-to-surface relation to the juncture of the second cross member 192 to form joint 208 and the free ends of the legs 146 of the second cross member 192 are supported by and are welded within the structures 144 and 148 (see FIG. 9) of the inner and outer pillar support structures 136, 138, respectively.

As can be appreciated from a comparison of FIGS. 3 and 4, the outer pillar member 116 may be welded to the pillar assembly 94 after the tubular hydroformed upper frame assembly 170 is assembled to the space frame. A stamped outer support 210 (see FIG. 4) is secured to the pillar assembly 98 and extends generally forwardly therefrom. The outer support 210 includes an inner portion 211 that is secured to the inner pillar member 114 and an outer portion 215 that is secured to the outer pillar member 116. The outer support 210 may be of stamped sheet metal construction and may be secured to the pillar assembly 98 by welding. The outer support 210 can be used to mount the vehicle fender and other body structures.

A roof panel 212, the outer rear quarter panel structures 140 and a plurality of door seal interface structures, generally designated 214, are mounted on the vehicle frame as shown, for example, in FIG. 4. A roof panel outer structure 216, which can be of stamped sheet metal construction, is mounted on each side of the vehicle along the roof rail 106 thereof and then downwardly along an upper portion of the D pillar 152 to the outer quarter panel structure 140.

Figure 14:
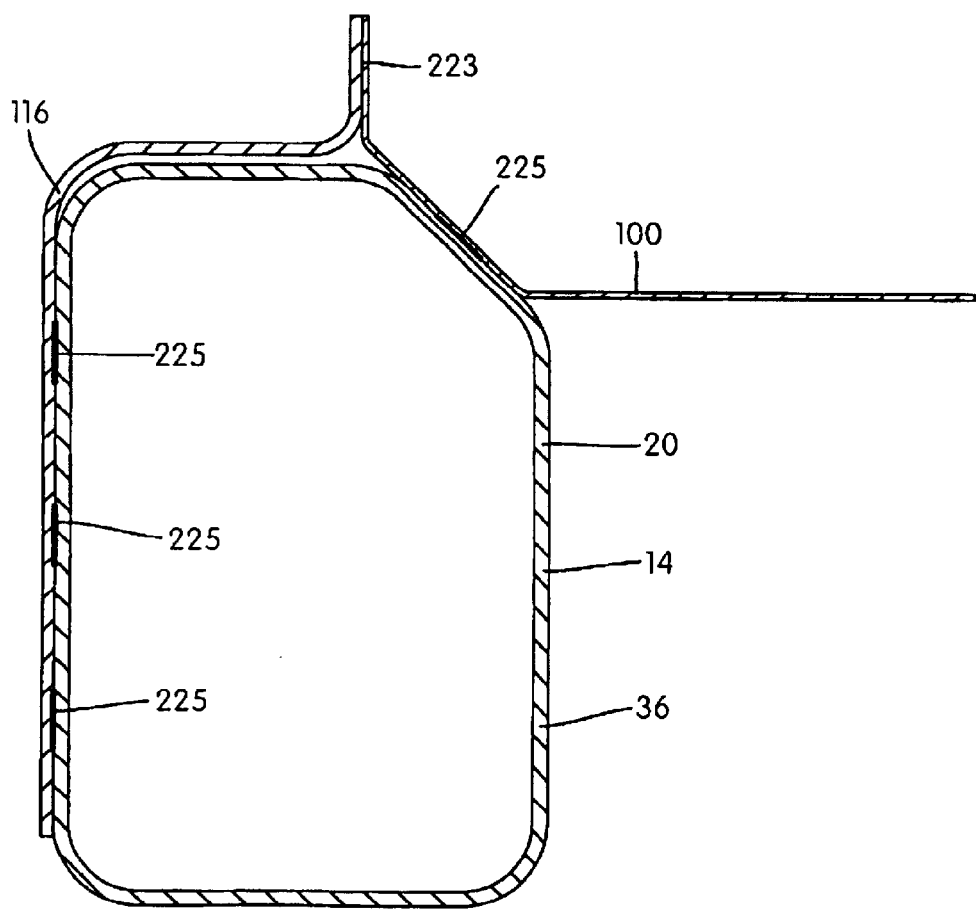
FIG. 14 is a cross sectional view taken through 14—14 as indicated in FIG. 4.

FIG. 7 shows that the inner and outer pillar members 114, 116 are welded together along seams 215, 217 and are shaped to provide the A pillar with a closed cross section. FIG. 8 is a cross sectional view showing the manner in which the inner and outer pillar members 114, 116, the inner and outer support elements 48, 50 and the dash panel 104 are secured together. Specifically, the outer pillar member 116, the outer support element 50 and the inner support element 48 are welded together along seam 219. The outer support element 50, the inner pillar member 114 and the dash panel 104 are welded together along seam 221. FIG. 14 shows that the outer pillar member 116 and the floor pan 100 are welded together along seam 223. The outer pillar member 116 and the floor pan 100 may also be welded to the rail member 14 by single sided spot welds (shown schematically) as at 225.

Figure 11:
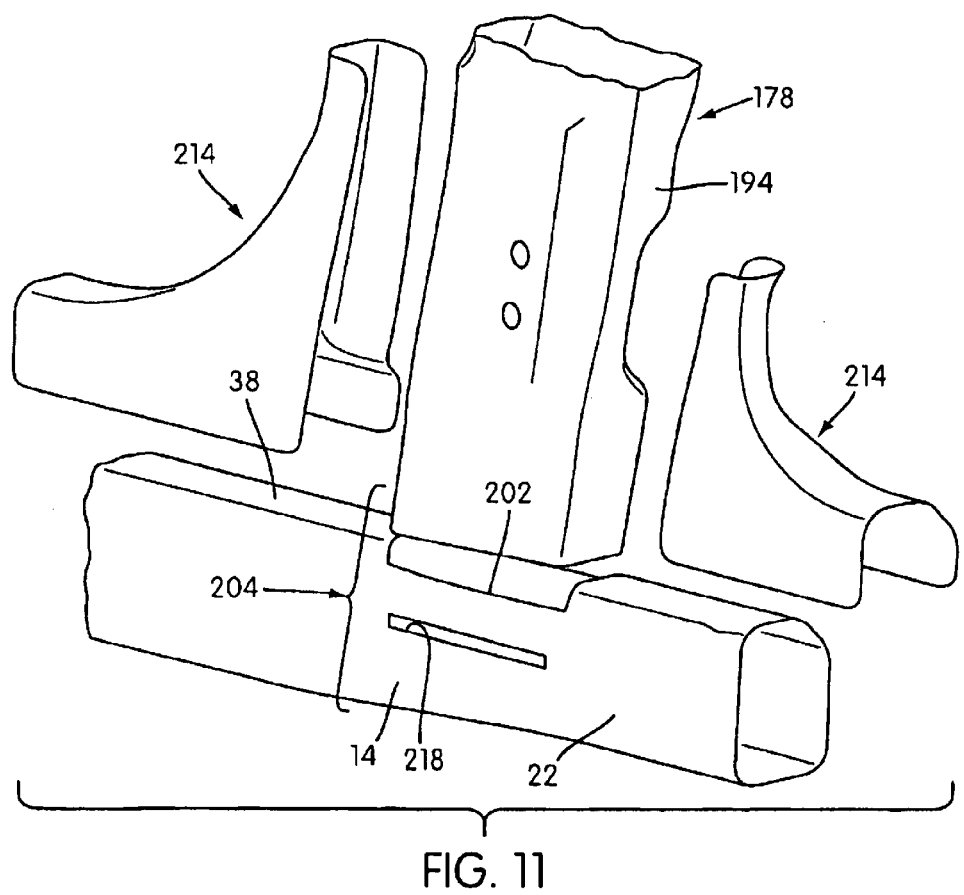
FIG. 11 is an exploded view of a portion of the space frame in the vicinity of a joint formed between a B pillar of the space frame and a side rail member of the space frame of FIGS. 1–4.
Figure 12:
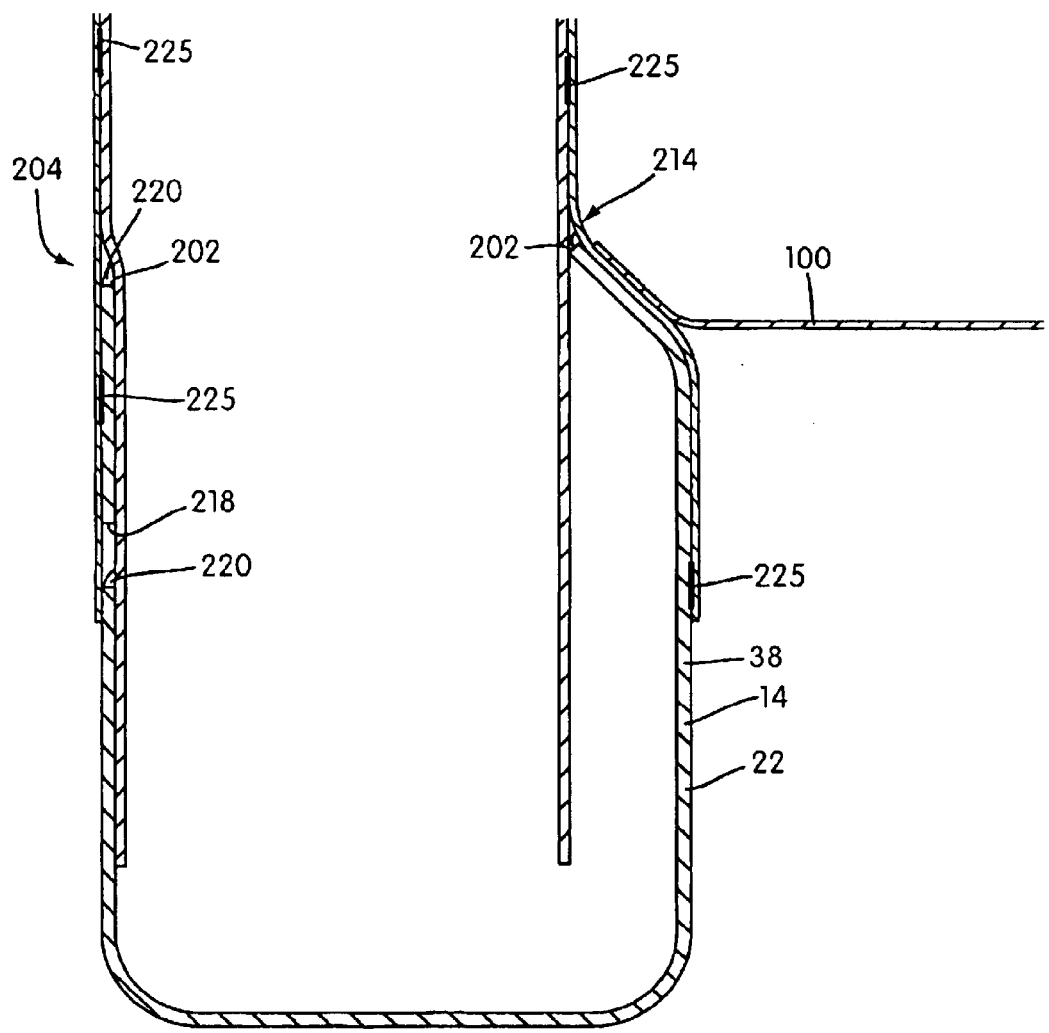
FIG. 12 is a cross sectional view taken through 12—12 as indicated in FIG. 4.
Figure 13:
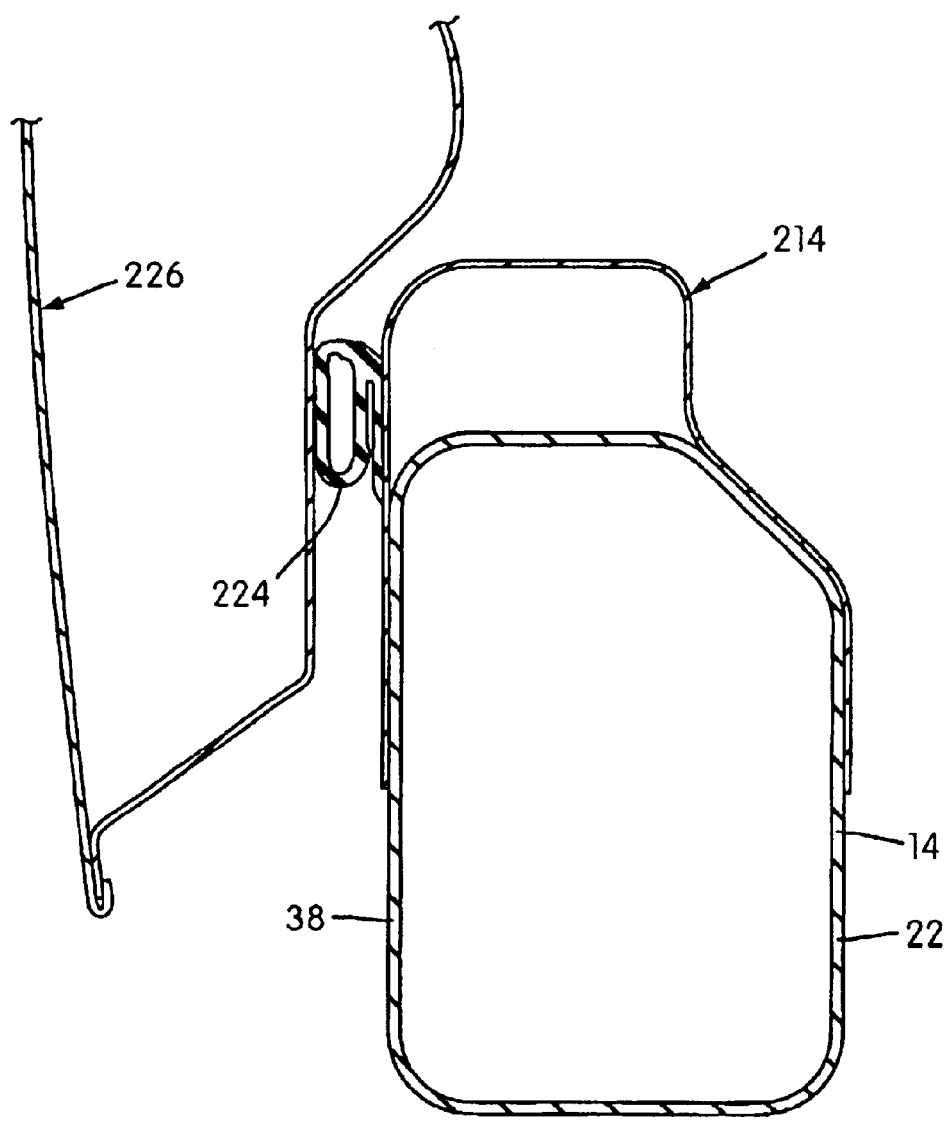
FIG. 13 is a cross sectional view taken through 13—13 as indicated in FIG. 4, and additionally illustrating a door and door seal.

FIG. 11 shows an exploded view of joint 204 and of two of the door seal interface structures 214. The opening 202 for the C pillar and a weld opening 218 may be laser cut in the side rail member 14. FIG. 12 shows the assembled joint 204 in cross-sectional view. The pillar, the side rail member 14, the door seal interface structure 214 and the floor pan 100 may be secured together by a series of welds, such as MIG welds, (shown schematically) as at 220 and a series of welds, such as single side spot welds (shown schematically) as at 222. A door seal 224 (see FIG. 13) is mounted on the transition structure 214 in the assembled vehicle and is positioned to engage a vehicle door 226 when the door 226 is in its closed position to seal the door.

Figure 15:
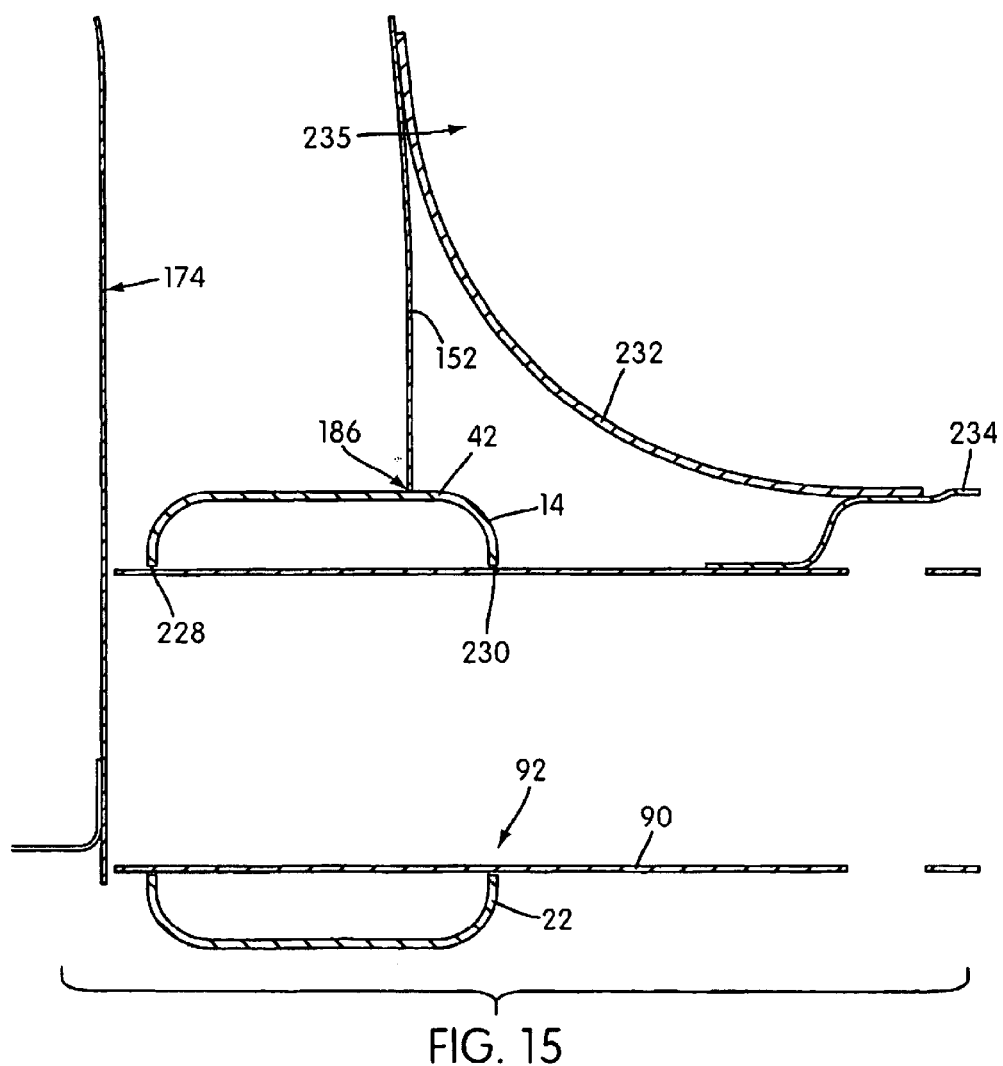
FIG. 15 is a cross sectional view taken through 15—15 as indicated in FIG. 4.

FIG. 15 shows construction of the space frame 10 the area of joint 92 and 186. Joint 92 is formed by inserting the tubular connecting member 90 through openings 228, 230 formed in opposite sides of the rail member 14 and welding the members 90, 14 together. Joint 186 is formed by cutting and removing several wall portions at a free end of the pillar portion 152 of the upper longitudinal member 174, placing the pillar portion 152 into contact with the exterior surface of the rail member 14 and welding the structures together. A rear pillar seal transition structure 232 is welded between a lower end of the pillar portion 152 of the upper longitudinal member 174 and an upper member 234 mounted on an upper surface of the rear cross member 90. The transition structure 232 forms a rounded corner of the rear opening 235 into the cargo compartment of the vehicle space frame 10. The structure 232 and the member 234 are preferably each metal structures that have been shaped by stamping and welded to the space frame 10.

Figure 16:
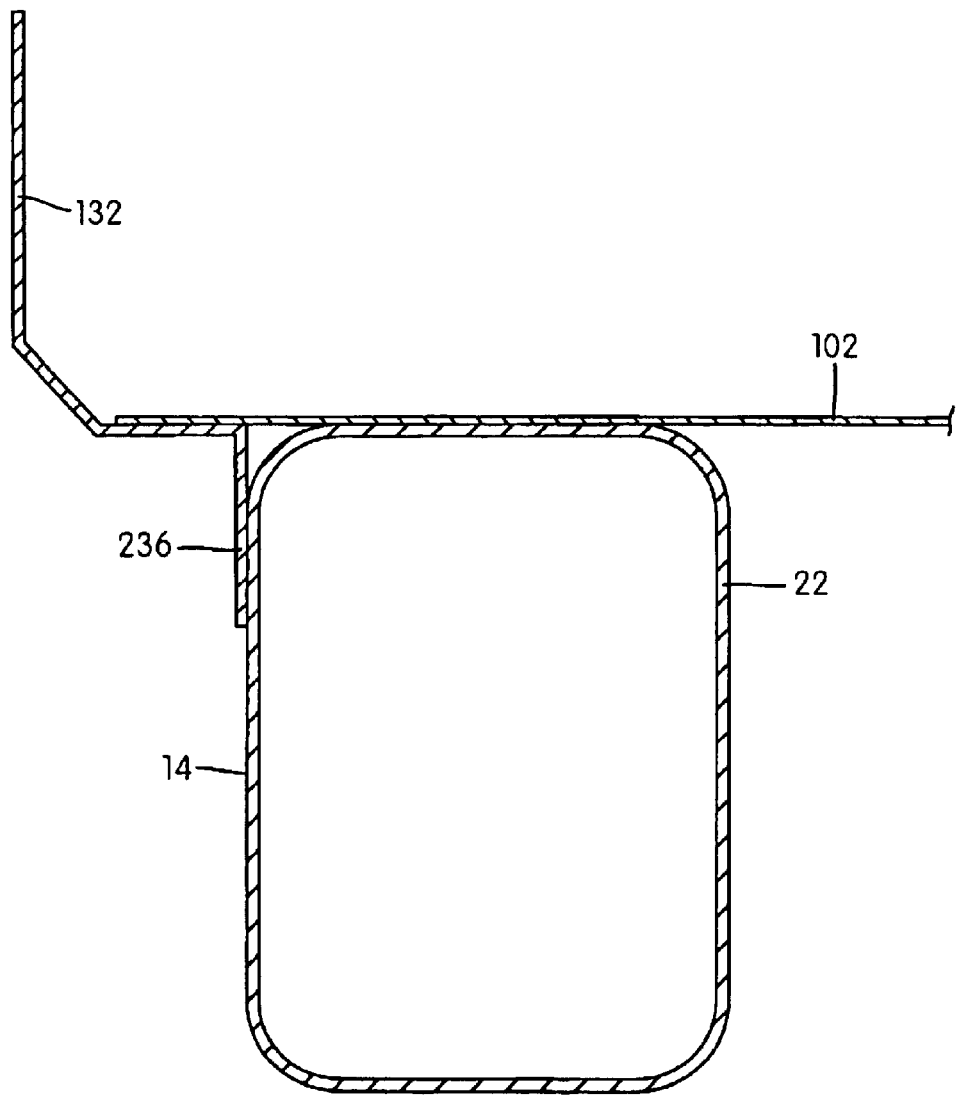
FIG. 16 is a cross sectional view taken through 16—16 as indicated in FIG. 4.

FIG. 16 is a cross-sectional view showing the manner in which the rear wheel house structure 132 and the floor pan 102 in the cargo compartment are mounted to the rail member 14 and to each other. The wheel house structure 132 includes a downwardly extending flange 236 that is secured by welding to the rail member 14 as, for example, by a series of single sided spot welds (not shown). The cargo floor pan 102 is welded to an upper surface of the rail member 14 and to an upper the facing surface of the wheel house structure 132.

Figure 17:
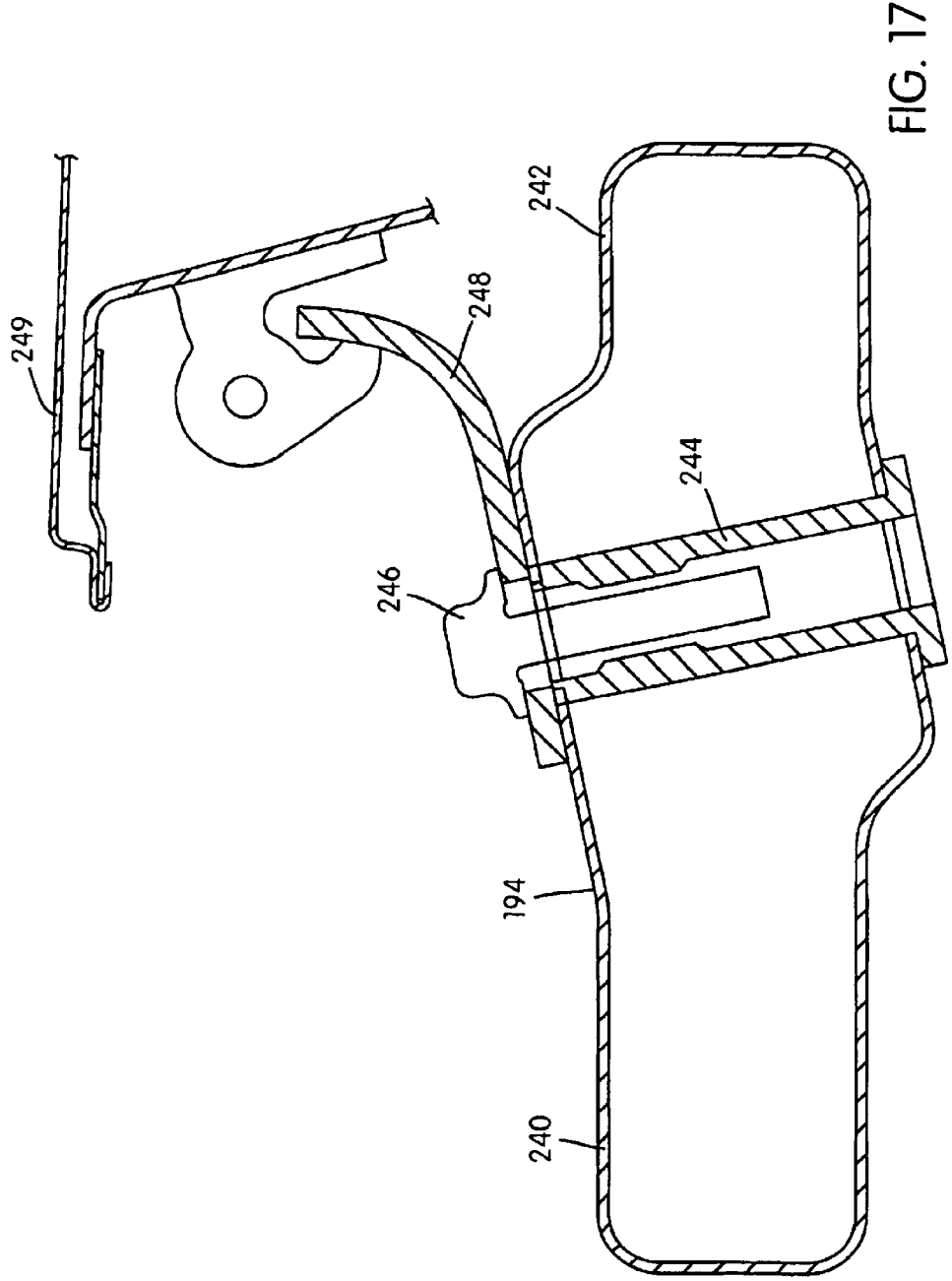
FIG. 17 is a cross sectional view taken through 17—17 as indicated in FIG. 4 and additionally illustrating a door and door hinge assembly.
Figure 18:
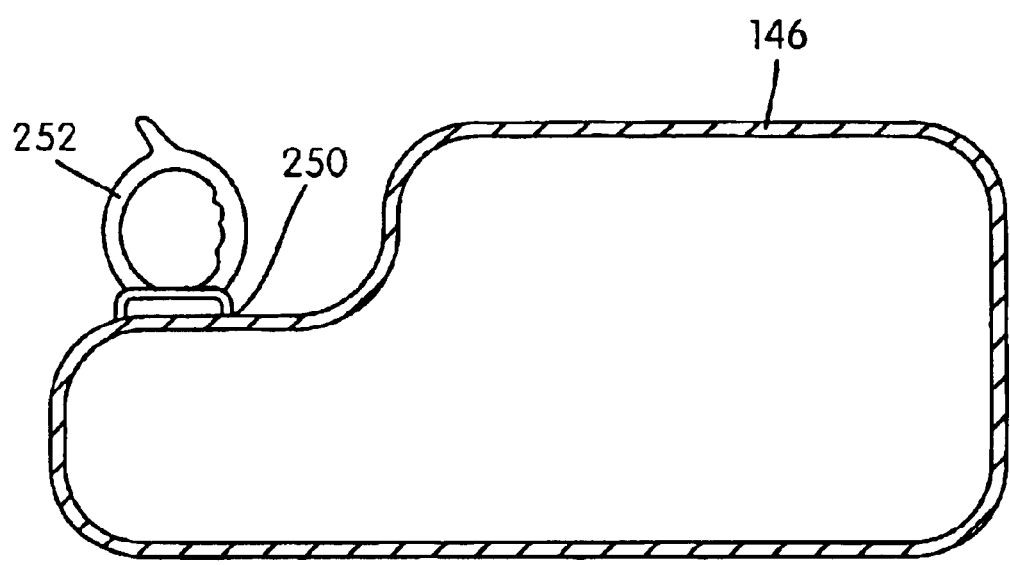
FIG. 18 is a cross sectional view taken through 18—18 as indicated in FIG. 4 and additionally illustrating a door seal attached to the C-pillar.

FIG. 17 shows a cross-sectional view of the B pillar. The B pillar has a tubular hydroformed construction. Outwardly facing surfaces 240 and 242 define seal engaging planes for a door seal (not shown in FIG. 17). An internally threaded hinge attachment sleeve 244 is inserted into the B pillar to receive a hinge bolt 246 to attach hinge 248 for a vehicle door 249. The C pillar is shown in cross-section in FIG. 18. The C pillar has a tubular hydroformed construction and defines a outwardly facing seal plane 250 for door seal 252.

Figure 19:
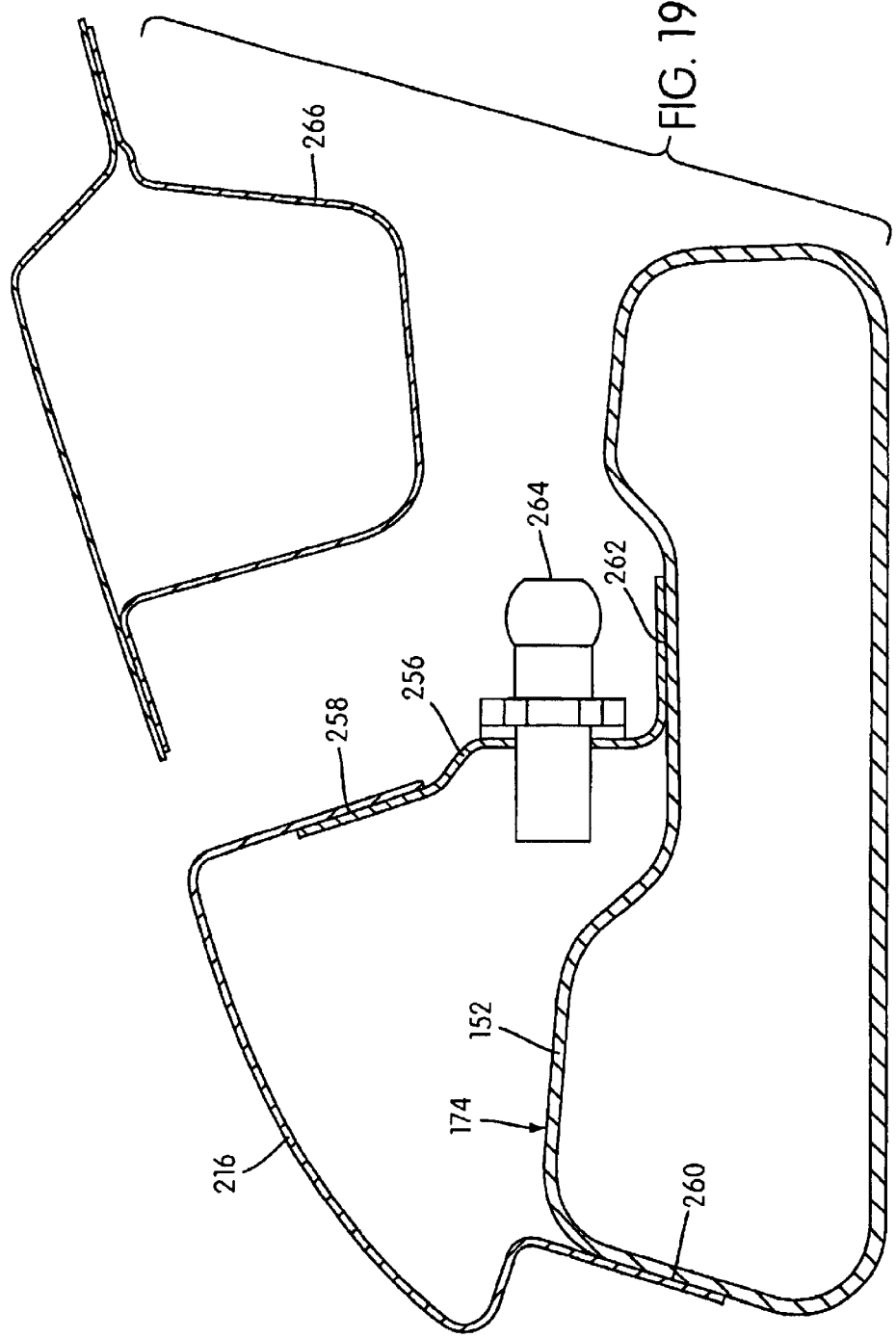
FIG. 19 is a cross sectional view taken through 19—19 as indicated in FIG. 4 and additionally illustrating a partial, cross-sectional view of the vehicle lift gate and its associated pivot mechanism.

FIG. 19 shows a cross-sectional view through the D pillar and shows a cross-sectional view of the roof panel outer 216. The roof panel outer 216 is attached to an upper prop rod attachment bracket 256 another along seam 258. The roof panel outer 216 is welded to the D pillar at seam 260 and the attachment bracket 256 is welded to the D pillar at 262. The bracket 256 serves as a pivotal point of attachment for a gas stroke assembly 264 (shown schematically) than is mounted to a vehicle liftgate 266 (shown in fragmentary view in FIG. 19).

Figure 20:
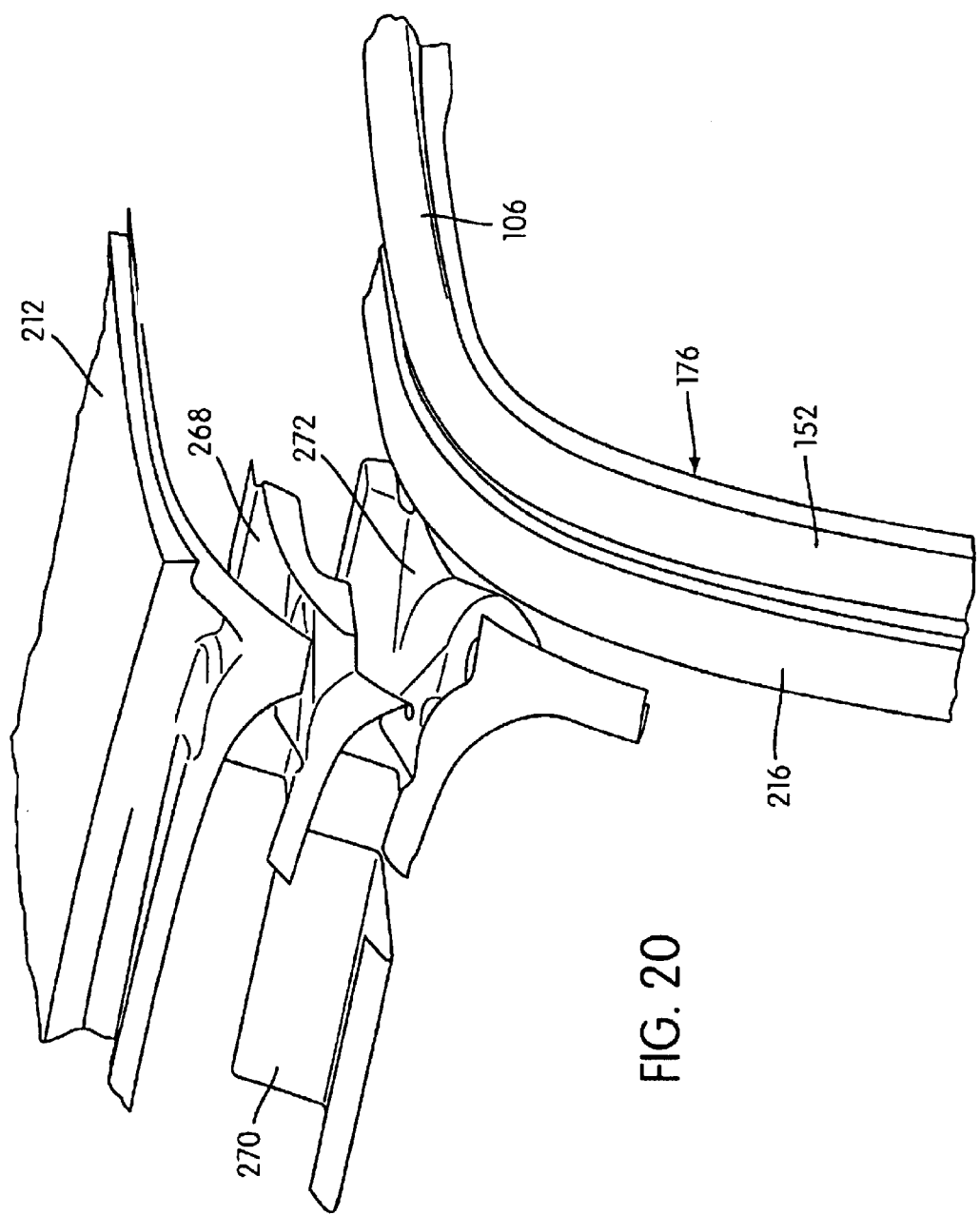
FIG. 20 is an exploded view of a portion of the space frame of FIGS. 1–4 showing an upper longitudinal member of the space frame and a roof rail outer structure mounted thereon in fragmentary view and showing various components that are mounted to the space frame in the vicinity of a transition between a roof rail portion of the upper longitudinal member and a pillar forming portion of the upper longitudinal member in fragmentary view.
Figure 21:
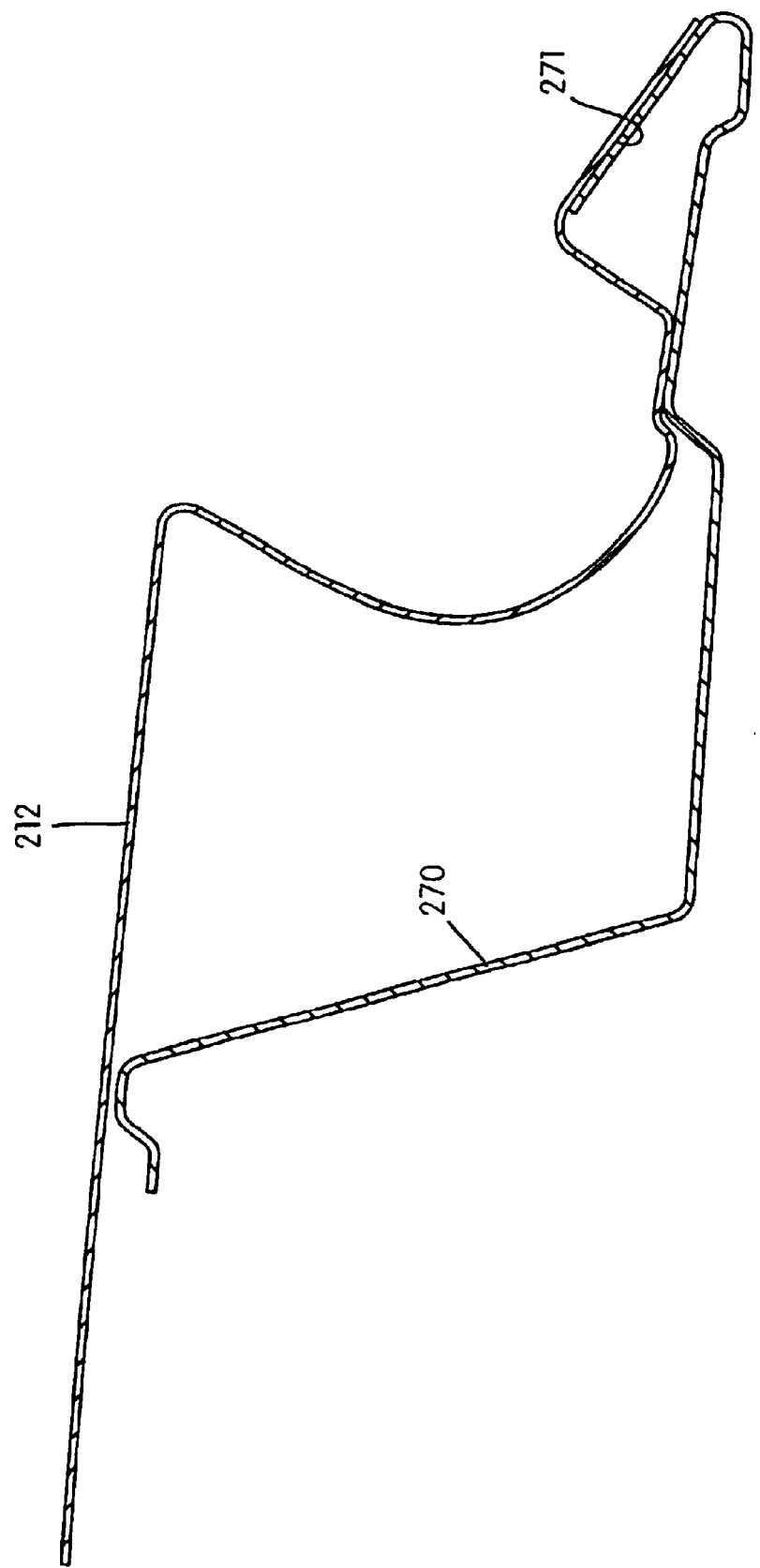
FIG. 21 is a cross sectional view taken through 21—21 as indicated in FIG. 4.

FIG. 20 shows the details of the construction of the space frame 10 in the vicinity of the transition between the pillar forming portion 152 and the roof rail forming portion 106 of the upper longitudinal member 176. The space frame 10 includes the roof panel 212, a liftgate hinge reinforcement structure 268, a D pillar header 270, and a roof rail to header bracket 272. FIG. 20 also shows the manner in which the roof panel outer 216 (also called the class "A" roof rail) is mounted to the upper longitudinal member 174. FIG. 21 shows the details of the manner in which the D pillar header 270 is secured to the roof panel 212. The header 270 is welded to the roof panel 212 along seam 271.

Figure 22:
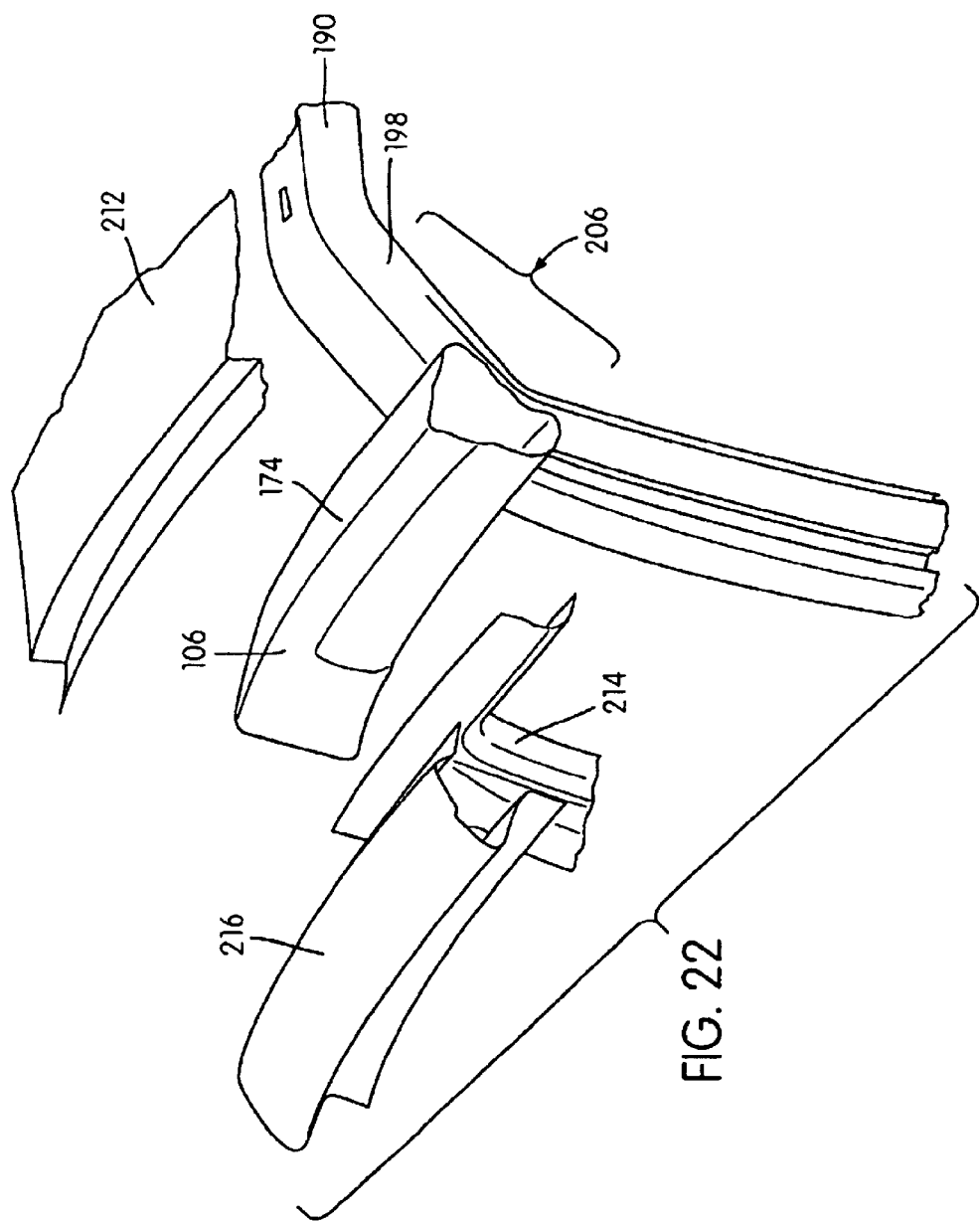
FIG. 22 is an exploded view of portions of the space frame of FIGS. 1–4 and components mounted thereto in the vicinity of a joint between the roof rail portion of the upper longitudinal member and a cross member of the space frame.
Figure 23:
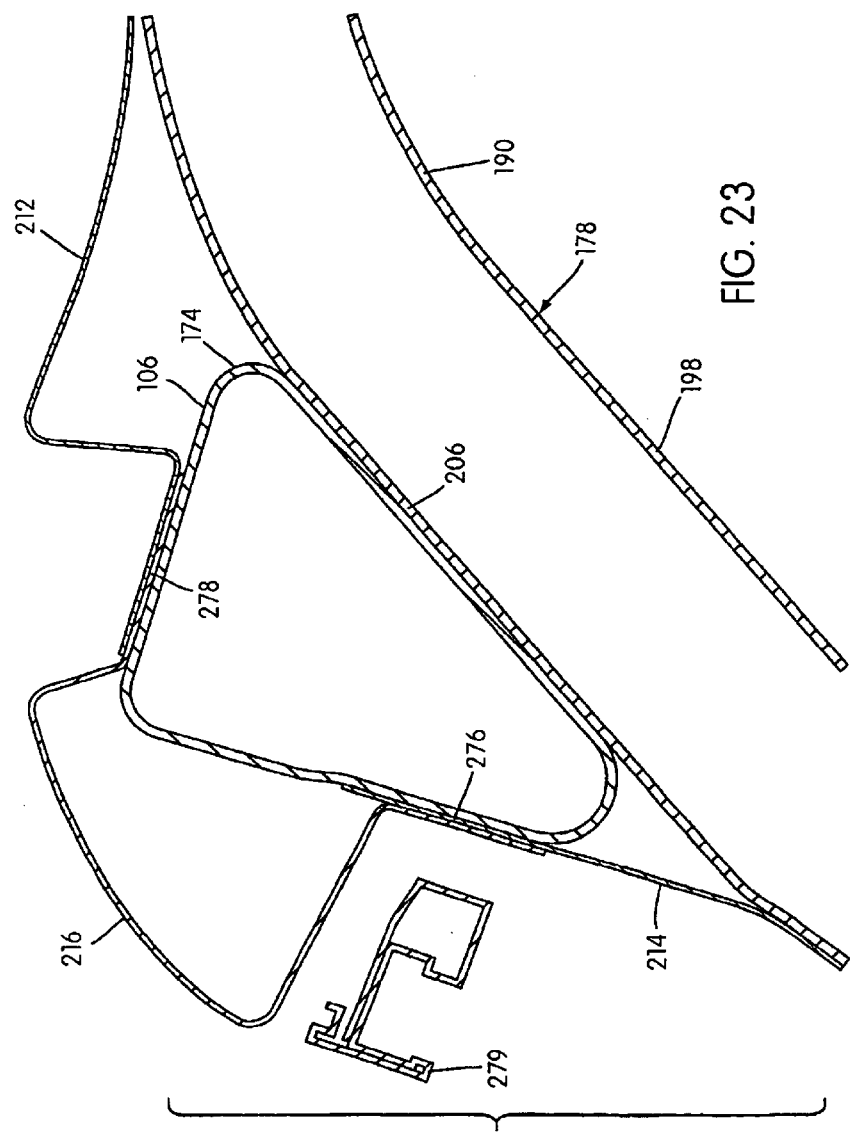
FIG. 23 is a cross sectional view taken through 23—23 as indicated in FIG. 4 and illustrating a portion of a vehicle door.

FIG. 22 shows an exploded view of the structure of the space frame 10 in the vicinity of the joint 206 between the roof rail portion 106 of the upper longitudinal member 174 and the first cross member 190. FIG. 22 shows the roof panel 212, the roof rail portion 106 of the upper longitudinal member 174, the cross member 190, a door seal transition structure 214 and the roof rail outer 216. FIG. 23 shows the manner in which these structures are related in the assembled space frame 10. Specifically, the roof rail portion 106 is welded in surface-to-surface relation to the juncture 198 of the cross member 190. The door seal transition structure 214 is welded to the roof rail portion 106 of the upper longitudinal member 174 and to a portion of the cross member 190. The roof rail outer 216 is welded to the transition structure 214 at 276 and to the roof rail portion at 278. The roof panel 212 is welded to the roof rail outer 216 at 278. A vehicle door 279 is shown in fragmentary view.

Figure 24:
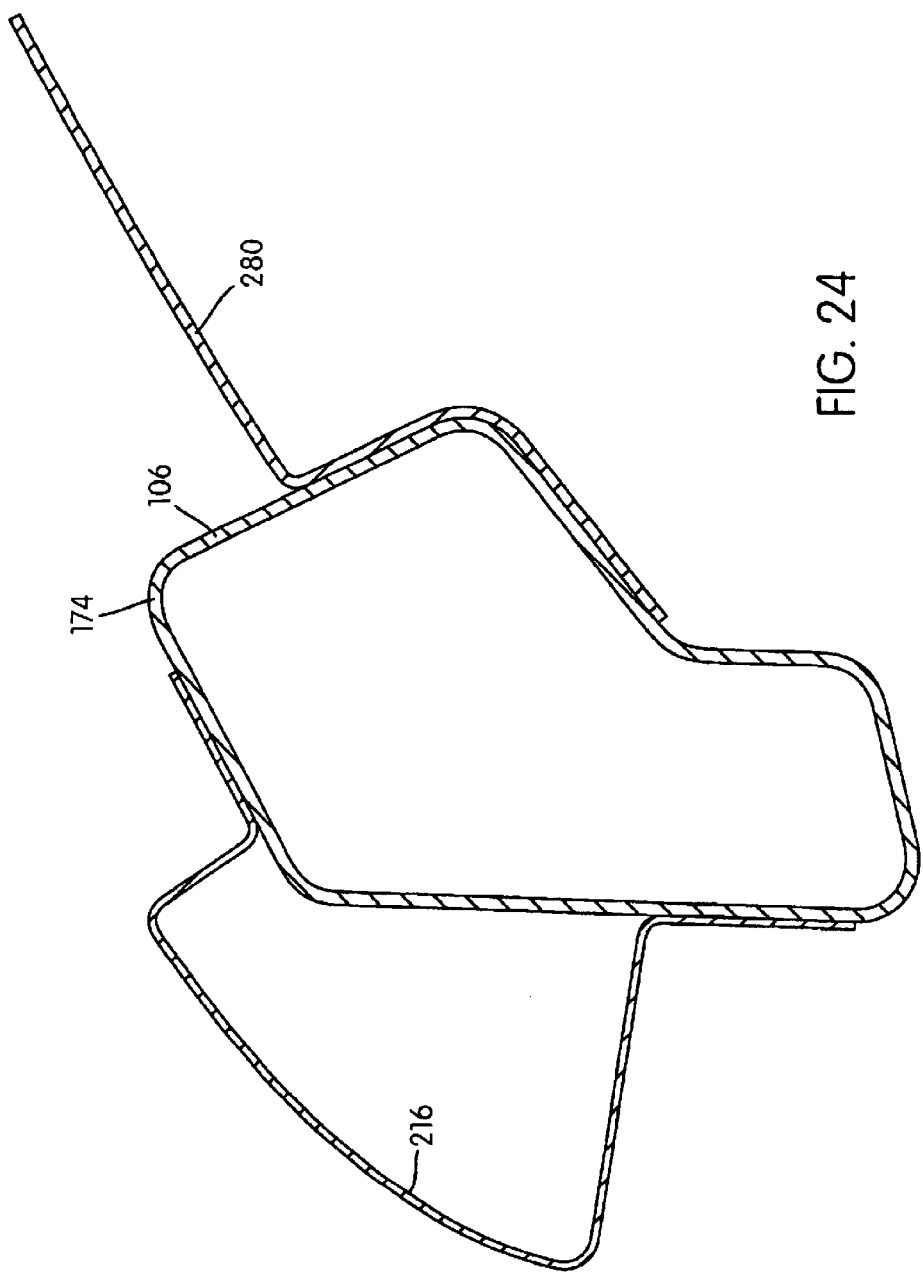
FIG. 24 is a cross sectional view taken through 24—24 as indicated in FIG. 4.

FIG. 24 is a cross sectional view through the roof rail portion 106 of the upper longitudinal member 174 showing a windshield header attachment structure 280 and the roof rail outer 216 welded to the roof rail portion 106 of the upper longitudinal member 174.

Figure 25:
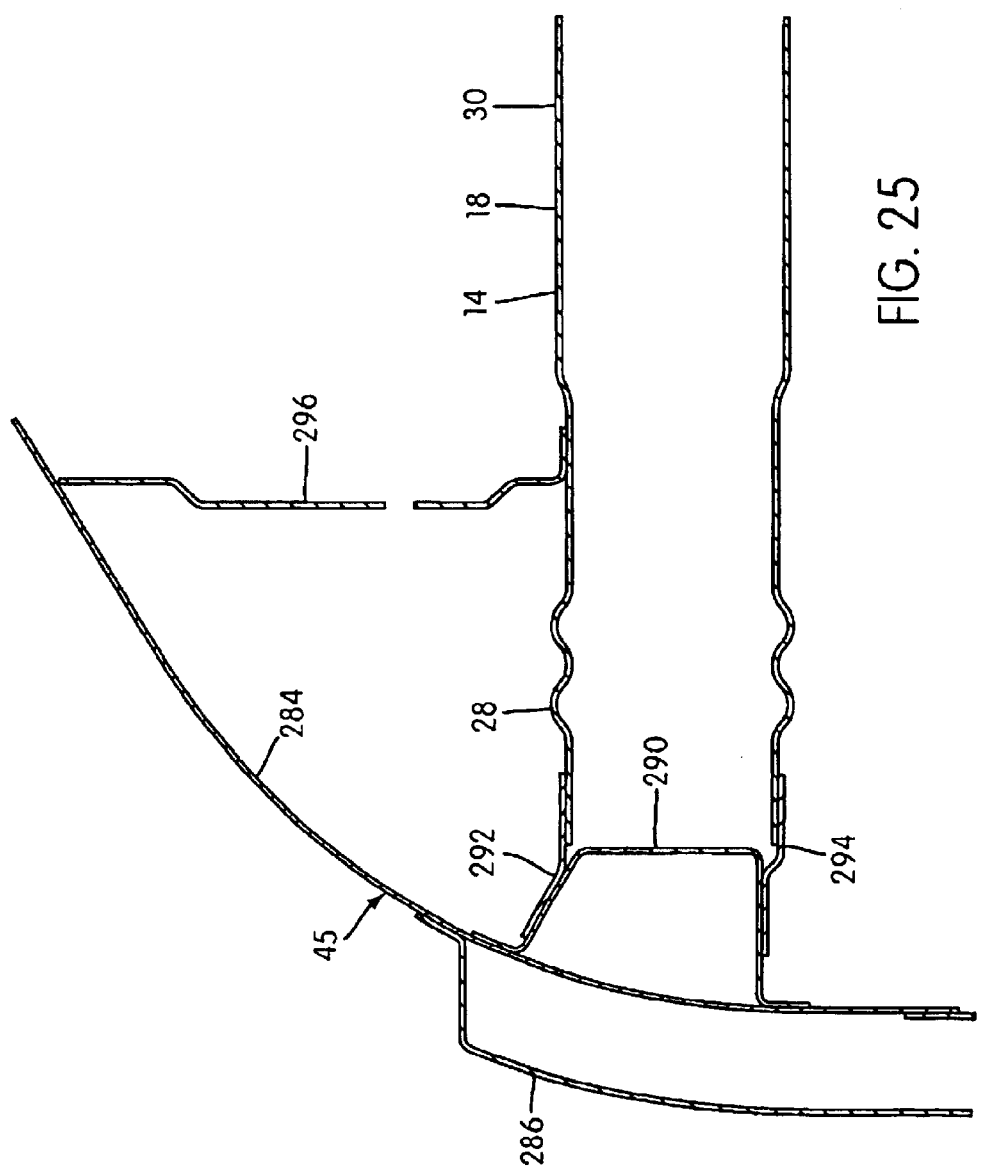
FIG. 25 is a cross sectional view taken through 25—25 as indicated in FIG. 4.

FIG. 25 shows in cross-sectional view the structure of the bumper assembly 45 and the manner in which the same is mounted to the rail member 14. Specifically, the bumper assembly 45 includes an arcuate inner bumper element 284 and an outer bumper element 286 welded thereto. A bumper attachment structure 290 is welded to the inner bumper element 284. A pair of bumped connecting members 292, 294 are welded between the attachment structure 290 and the forwardmost end of the rail member 14 to attach the bumper assembly 45 to the side rail member 14. An attachment bracket 296 is secured between an outer portion of the bumper element 284 and a side portion of the rail member 14.

Figure 26:
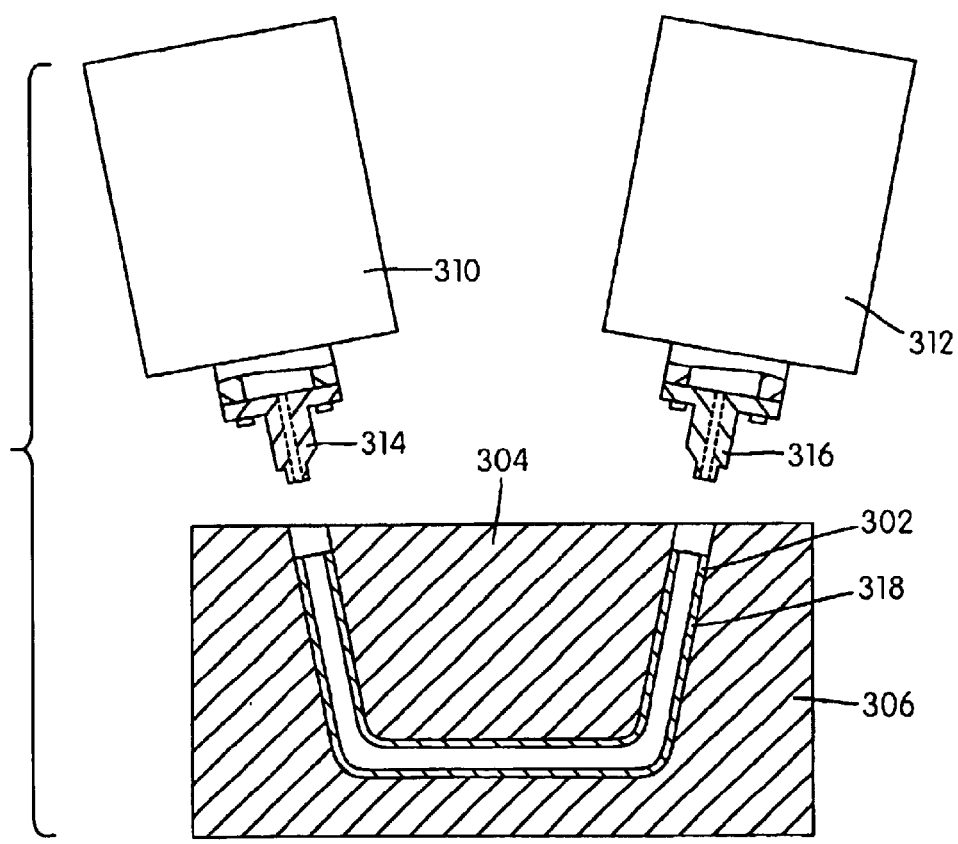
FIG. 26 is a schematic view of a tubular hydroforming die assembly showing a blank mounted therein for forming certain members found in the frame of FIGS. 1–4.

Because many of the structural features of each hydroformed member are formed during a hydroforming operation that creates the same, a preferred method of hydroforming the tubular hydroformed components of the space frame 10 will be considered. A preferred hydroforming operation for forming the hydroformed support member 10 can be understood from FIG. 26. An example of a hydroforming operation will be given using member 190. Each hydroformed member, such as hydroformed U-shaped member 190, may be formed from a tubular blank 302. The blank 302 is constructed of a suitable metallic material and has a closed transverse cross section and open tubular ends. Preferably, the blank 302 is constructed of a suitable grade of steel. Each blank 302 may be formed by any suitable method. For example, a continuous strip of metallic material may be shaped by roll forming and seam welding to have a closed transverse cross section. Alternatively, a continuous length of metallic tubing may be formed by extrusion. The continuous tubular structure may then be cut to the length required to form a U-shaped member 190.

The blank 302 is preferably bent into a "U" shape prior to being placed in a hydroforming die assembly. Each leg portion of the member 302 preferably forms relatively sharp angle with the central cross portion thereof. Because the angle in the U-shaped member 190 is relatively "sharp" (that is, at an angle greater than 30°), these angles require relatively sharp bends in the blank 302. Preferably the present invention bends the blank 302 according the teachings of U.S. Pat. No. 5,953,945 entitled METHOD AND APPARATUS FOR WRINKLE-FREE HYDROFORMING OF ANGLED TUBULAR PARTS, which is hereby incorporated herein by reference in its entirety. The teachings of the '945 patent reference can be used to avoid wrinkle formation during the bending operation, particularly on the concave portion of each bend in a hydroformed part. A blank 302 may be bent in a computer numeric controlled ("CNC") bending machine prior to being placed in the die assembly or, alternatively, may be bent by stretch bending to achieve the "U" shape. The U-shaped blank 302 includes an essentially straight, longitudinally extending central portion and a pair of legs extending from opposite ends of the central portion. The juncture or "elbow" formed between the central portion and each leg defines a concave exterior surface portion on one side thereof and a convex exterior surface portion on an opposite side thereof. A suitable lubricant may be applied to the exterior of the blank 302 prior to placing it in the die assembly.

With reference again to FIG. 26, the U-shaped tubular blank 302 is then placed between the die halves 304, 306 of the die assembly 308 and the assembly is closed. The tubular blank 302 is preferably immersed in a fluid bath so that it is filled with hydroforming fluid. A hydroforming ram assembly 310, 312 is engaged with each end of the tubular blank 302 such that a ram member 314, 316 of each assembly 310, 312 seals a respective end of a tubular blank 302. The ram members 314, 316 include hydraulic intensifiers which can intensify the hydroforming fluid, thereby increasing the fluid pressure of the fluid within the blank 302 to outwardly deform tubular metallic wall, generally designated 318, of the tubular blank 302 into conformity with the die surfaces 320 of the die cavity (as disclosed in the '945 patent reference) to thereby form a hydroformed member having an exterior surface that is fixed into a predetermined regular or irregular (depending on the shape of the die cavity) configuration.

The tubular blank 302 may have, for example, an essentially equal diameter, essentially circular cross section prior to outward expansion during the hydroforming process. The hydroforming process may be computer controlled. The flow of the hydroforming fluid may be controlled to control, in turn, the manner in which the metallic material of the blank 302 "flows" (in a radial direction) or expands during the hydroforming process. Preferably, the ram members 314, 316 push axially inwardly on opposite ends of the blank 302 to create metal flow within the blank 302 during outward expansion. The fluid pressure and the axial pressure are independently controllable. Preferably, the ends of the tubular blank 302 are pushed axially inwardly during the hydroforming operation to maintain the wall thickness of the fully formed hydroformed member 190 within a predetermined range of the wall thickness of the initial tubular blank 302. Because each juncture is defines an area in which the straight tubular blank is bent at a relatively sharp angle, the exterior surface of the blank 302 has a concave surface portion and a convex surface portion on generally opposite sides of the blank 302. Preferably each ram member 314, 316 applies a force to the associated end of the blank 302 so as to create longitudinal flow of metallic material within the blank 302 to maintain a wall thickness of the blank within a predetermined range and preferably the ram members apply a greater amount of force to a portion of the blank which is longitudinally aligned with the convex surface portion of the tubular blank in comparison with the amount of force applied to a portion of the blank which is longitudinally aligned with the concave surface portion of the blank so as to create a greater amount of flow of metal material toward portions of the blank 302 that are adjacent the convex surface portion in comparison with portions of the blank adjacent the concave surface portion. This inhibits wrinkle formation in portions of the blank adjacent the concave surface portion as discussed in detail in the aforesaid '945 patent reference. Preferably the ram members 314, 316 cooperate to replenish or maintain the wall thickness of the outwardly expanding wall portions of the blank 302 so that the wall thickness of the resulting hydroformed member is within about +/−10% of the original wall thickness of the blank 302 (i.e., to compensate for wall thinning during diametric outward expansion of the tube).

The tubular blank 302 expands into conformity with the surfaces defining the hydroforming die cavity so as to irregularly outwardly expand the metallic wall of the blank 302 into conformity with the surfaces of the die assembly to provide the metallic wall with a shape corresponding to the U-shaped member 190. The shape of each die cavity used to form the support member 10 thus corresponds to the shape of the U-shaped member 190.

If holes are to be formed in the U-shaped member 190, the holes may be formed while the member 190 is in the die assembly during the hydroforming operation or may be formed after the hydroformed member 190 is removed from the die assembly along with any other required further processing of the member 190. More particularly, holes may be formed during the hydroforming process in what is known as a hydropiercing operation. A hydropiercing operation is disclosed in U.S. Pat. No. 5,460,026, which is hereby incorporated by reference in its entirety into the present application. Alternatively, holes or notches of various sizes and shapes may be cut (preferably using a laser) in the member 190 after the hydroforming operation is completed.

It can be appreciated that, as a result of the expansion of the blank 302 during the hydroforming operation, the transverse cross section of the U-shaped member 190 varies along its length so that the central portion of the member 190 may have a relatively small, somewhat rectangular cross-section and each leg portion may have a relatively larger, essentially rectangular cross-section. It is also contemplated to hydroform the various portions of the U-shaped member 190 to is have other cross sectional configurations (including other sizes and shapes). It can thus be understood that altering the cross-sectional configuration of this tubular hydroformed member 190 can be accomplished without departing from the principles of the present invention.

The space frame 10 is referred to as a "hybrid" space frame because it incorporates non-hydroformed members, that is, members that can be formed utilizing methods other than hydroforming such as, for example, by sheet metal stamping, (i.e., the forward-most pillar assemblies 94, 96 which comprise the A pillars and the pillar support assemblies 98, 99 for the C pillars) into a predominantly tubular hydroformed frame assembly (comprised of the lower frame assembly 12 and the upper frame assembly 170). This hybrid frame construction allows automobile manufacturers to implement the space frame concept in vehicles having limited space between the interior and the exterior of the motor vehicle. The integration of non-hydroformed components in an otherwise hydroformed frame enables the vehicle manufacturer to provide a weight efficient vehicle space frame in a package that fits within the space constraints inherent in a certain vehicle designs.

More specifically, it can be appreciated from, for example, FIGS. 1–4 that the front and rear wheels (not shown in the figures but generally disposed within wheel wells 52 and 56, respectively, of the assembled vehicle) are very near to the passenger compartment area 60 in the longitudinal vehicle direction. For example, the rearward-most extent of the front wheel is longitudinally spaced only a few millimeters (perhaps on the order of 30–40 mm) from the dash panel 104 (which generally defines the forward-most extent of the passenger compartment area 60. Similarly, the forward-most extent of the rear wheel is longitudinally spaced very close to the rearward-most extent of the passenger compartment area 60. This short wheelbase (i.e., the longitudinal length between the front and rear wheels) relative to the longitudinal length of the passenger compartment area 60 and the consequent relatively close longitudinal spacing of the front and rear wheels to the passenger compartment area 60 require the formation of two approximately 90 degree transitions to define the front and rear wheel wells 52, 56. The tubular hydroformed rail members 14, 16 cannot be easily shaped to curve or "transition" from the rocker panel forming portions (sections 36 and 38, for example) thereof inwardly at approximately a 90 degree angle (i.e., laterally) and then longitudinally at approximately a 90 degree angle to forming the wheel wells 52, 56. It can be appreciated from FIG. 1, for example, that the transition angle between the longitudinally extending section 36 of the central portion 20 of the rail member 14 and the angled section 34 thereof is not sharp enough to define the full extent of the rocker panel of the vehicle space frame and the rearward portion of the front wheel well 52. The non-hydroformed pillar support structure 44 provides the forward most end of the rocker panel and provides a relatively sharp (approximately 90 degree) transition angle between the rocker panel portion 54 of the space frame 10 and the rear portion of the front wheel well 52. Thus, this hybrid design allows the vehicle manufacturer to incorporate a pair of tubular hydroformed lower side rail members 14, 16 that extend the length of the vehicle while still meeting the packaging requirements for manufacturing a compact vehicle.

Figure 5:
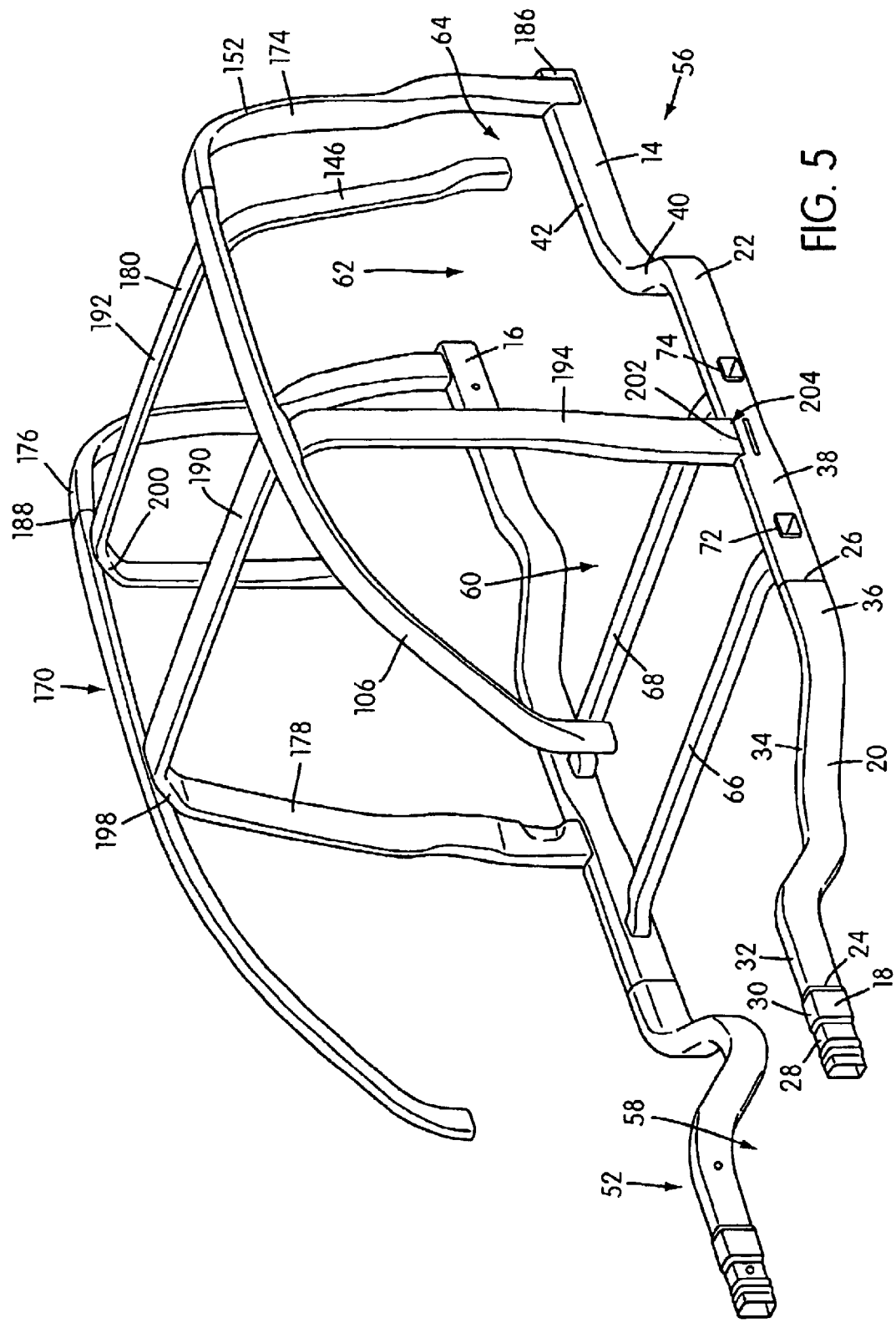
FIG. 5 is an isolated view of a hydroformed portion of the assembled space frame of FIGS. 1–4 with stamped sheet metal portions thereof removed and not shown.

The benefits of this hybrid construction can be appreciated from FIG. 5, which shows the hydroformed portion of the space frame 10 in isolation with the non-hydroformed portions removed and not shown. It can be appreciated from this view that the A pillars (not shown in FIG. 5 but positioned generally below and in line with the downwardly extending free ends of the roof rails 106) and the C pillars are spaced laterally outwardly from one another to maximize the width of the passenger compartment area 60. Because the hydroformed lower side rail members 14, 16 transition angularly at the front and rear portions thereof to help define the front and rear wheel wells 52, 56, the free ends of the roof rails 106 and the free ends of the C pillars are spaced outwardly from the portions of the hydroformed rail members 14, 16 below. The non-hydroformed or stamped forwardmost pillar assembly 94, 96 and the pillar support assemblies 98, 99 provide the A pillars and support the C pillars, respectively, while still fitting within the compact vehicle design package.

The rail sections 34, 36, 38, 40, the non-hydroformed or stamped pillar support structures 44, 46, the inner rails 76, 78 and the connecting structures 66, 68, 70, 86 generally comprise a "torque box" which includes a section of the lower frame assembly 12 under the passenger compartment area 60 that reacts to crash loads. By making the A pillars and the box-like pillar support structures 44, 46 into non-hydroformed or stamped structures, the space frame 10 is able to react to crash loads both on the outer hydroformed longitudinally extending side rail members 14, 16 and on the inner stamped longitudinal rails 76, 78. Because the connecting members 66 and 68 are of tubular hydroformed construction and thus have a relatively high degree of strength to, for example, support loads and to resist information during impact, these cross members 66, 68 are architectural in the sense that they support the seats load and improve the torsional properties of the vehicle by making the vehicle torsionally rigid.

The non-hydroformed construction of the A pillar assemblies 94, 96 provides improved incorporation of various frame components over a completely hydroformed design.

For example, because each A pillar can be of non-hydroformed construction, such as stamped construction, it can be better integrated into the surrounding sheet metal structures including the dash panel, a shock tower 299 (see, for example, FIG. 3) the upper and lower plenum structures and so on. The shock tower 299 may be provided for housing a strut assembly for the front suspension, such as a MacPherson strut assembly.

It should be understood that in the description of the illustrated embodiment reference to welding to couple elements together is only one possible manner of coupling the elements together and that other fastening mechanisms or fasteners can be used instead of or together with welding. Also, it should be understood that the non-hydroformed members discussed herein can be formed of any non-hydroforming process including stamping and other types of processes. The references to "stamping" and to "stamped" sheet metal construction is made since it is a preferred method of manufacturing the non-hydroformed members in the illustrated embodiment, however, other types of non-hydroforming processes can be employed in the illustrated embodiment.

It can be understood that the embodiment of the vehicle space frame shown and described herein is an example only and is not intended to limit the scope of intention. For example, it is contemplated, to provide a hybrid space frame for other size vehicles and other types of vehicles including sports utility vehicles, vans and trucks of all types. It is also contemplated to vary the construction of the space frame. For example, the example embodiment of the space frame 10 shows the A pillar being provided by a forward pillar assembly on each side thereof. It is not intended to limit the scope of the invention to this construction. For example, it is contemplated to form an upper portion of the A pillar or, alternatively, the entire A pillar using a tubular hydroformed member. Each upper longitudinal member may be formed to include a forward pillar-forming portion that extends integrally downwardly from the rail-form portion thereof. The forward pillar-forming portion of each upper longitudinal member may extend downwardly to provide pillar structure that forms the entire A pillar or, alternatively, the forward pillar-forming portion may extend downwardly to form only the upper portion of a pillar structure and thereby form only an upper portion of the associated A pillar. When the forward pillar-forming portion of the upper longitudinal member forms the entire A pillar, the lower end of the forward pillar-forming portion may be secured to the associated lower side rail member utilizing a stamped sheet metal assembly such as, for example, pillar support structure 44. When the forward pillar-forming portion of the upper longitudinal member forms only an upper portion of the associated A pillar, the lower portion of the A pillar may be provided by an assembly of stamped sheet metal components. For example, a forward pillar assembly similar to forward pillar assembly 94 except vertically shorter could be constructed to provide a lower portion of the associated A pillar and to couple with the forward pillar-forming portion of the associated upper longitudinal member. In this instance, then, a lower portion of each A pillar is of stamped sheet metal construction and the upper portion of each A pillar is of tubular hydroformed construction.

It can be understood that, while illustrated embodiments of the invention have been disclosed and described with reference with a limited number of embodiments, it will be apparent that variations and modifications may be made thereto without departing from the spirit and scope of the invention. Therefore, the following claims are intended to cover such modifications, variations, and equivalents thereof in accordance with the principles and advantages noted herein.

What is claimed is:

1. A space frame for a motor vehicle, comprising:
    a pair of hydroformed longitudinally extending lower side rail members;
    a pair of hydroformed upper longitudinal members, each of said pair of said upper longitudinal members including a rear, pillar-forming portion and a rail-forming portion, each of said pillar-forming portions being coupled to an end of a respective one of said lower side rail members and extending upwardly from said respective lower side rail member to define a rearward-most pillar of said motor vehicle, each of said rail-forming portions extending forwardly from said pillar-forming portion to define a roof support rail of said motor vehicle;
    a pair of forward-most pillar assemblies, each of said pair of forward-most pillar assemblies being coupled a respective one of said pair of lower side rail members and extending upwardly from said respective lower side rail member and being coupling with a respective one of said upper longitudinal members, and each of said forward-most pillar assemblies being formed from stamped sheet metal; and
    a laterally extending connecting structure mounted between said pair of lower side rail members, said connecting structure being constructed and arranged to hold said pair of lower side rail members in laterally spaced relation to one another.

2. A space frame as defined in claim 1, wherein each hydroformed upper longitudinal member further includes a forward pillar-forming portion extending from a forward end of an associated roof support rail, the forward pillar forming portion of each said upper longitudinal member being coupled to an associated forward-most pillar assembly to define a pair of A pillars of said motor vehicle, each forward-most pillar assembly defining a lower portion of the associated A pillar and the forward pillar-forming portion of each upper longitudinal member defining an upper portion of the associated A pillar.

3. A space frame as defined in claim 1, wherein each forward-most pillar structure is coupled to a forward end of the rail-forming portion of the associated upper longitudinal member, each of said forward-most pillar assemblies defining an A pillar of said motor vehicle.

4. A space frame as defined in claim 3, wherein a forward portion of each of said pair of lower side rail members defines a first portion of a respective front wheel well.

5. A space frame as defined in claim 4, wherein a lower portion of each of said forward-most pillar structures forms a second portion of said respective front wheel well.

6. A space frame as defined in claim 3, wherein each of said forward-most pillar assemblies is connected to an exterior side portion of said respective lower side rail member.

7. A space frame as defined in claim 6, wherein an intermediate portion of each lower side rail member defines a portion of a rocker panel on a respective side of said motor vehicle and wherein the forward portion of each lower side rail member curves inwardly from the respective intermediate portion thereof to define each said front wheel well, each forward most pillar assembly being coupled to the intermediate portion of the associated lower side rail member of such that each forward-most pillar assembly defines a forward portion of the associated rocker panel.

8. A space frame as defined in claim 7, wherein the A pillar defined by each forward-most pillar assembly has a closed cross section.

9. A space frame as defined in claim 1, wherein each of said lower side rail members includes three, individual pieces.

10. A space frame for a motor vehicle, comprising:
a pair of hydroformed longitudinally extending lower side rail members;
a pair of hydroformed upper longitudinal members, each of said pair of said upper longitudinal members including a rear pillar-forming portion and a rail-forming portion, each of said pillar-forming portions being coupled to an end of a respective one of said lower side rail members and extending upwardly from said respective lower side rail member to define a rearward-most pillar of said motor vehicle, each of said rail-forming portions extending forwardly from said rear pillar-forming portion to define a roof support rail of said motor vehicle;
a pair of pillar support structures, each pillar support structure being of stamped sheet metal construction and each said pillar support structure being connected to a respective lower side rail member at the location to support a forward-most pillar structure;
a pair of forward-most pillar structures, each pillar structure being coupled at a lower end thereof to an associated pillar support structure and being coupled at an upper end thereof to an associated upper longitudinal member; and
a laterally extending connecting structure mounted between said pair of lower side rail members, said connecting structure being constructed and arranged to hold said pair of lower side rail members in laterally spaced relation to one another.

11. A space frame for a motor vehicle as defined in claim 10, wherein each upper longitudinal member further includes a forward pillar-forming portion, each forward pillar-forming portion extending from a forward end of the rail portion of the associated upper longitudinal member, each forward pillar-forming portion being connected at a lower end thereof to a respective pillar support structure, to provide a forward-most pillar structure on a respective side of said motor vehicle.

12. A space frame for a motor vehicle as defined in claim 10, wherein each upper longitudinal member further includes a forward pillar-forming portion and each forward pillar-forming portion extends from the forward end of the rail portion of the associated upper longitudinal member and wherein each forward-most pillar structure is of stamped sheet metal construction and is coupled to the forward pillar-forming portion of the associated upper longitudinal member, each forward-most pillar structure and the associated forward pillar-forming portion of each upper longitudinal member thereby defining an A pillar on a respective side of said motor vehicle.

13. A space frame for a motor vehicle as defined in claim 12 wherein said forward-most pillar structure has a closed cross section.

14. A space frame for a motor vehicle as defined in claim 10, wherein each forward most pillar structure is of stamped sheet metal construction, each said forward most pillar structure being connected at an upper end thereof to the rail forming portion of the associated upper longitudinal member, each forward most pillar structure thereby defining an A pillar on a respective side of said motor vehicle.

15. A space frame for a motor vehicle as defined in claim 14 wherein said forward-most pillar structure has a closed cross section.

16. A space frame for a motor vehicle, comprising:
a pair of hydroformed longitudinally extending lower side rail members;
a pair of hydroformed upper longitudinal members, each of said pair of said upper longitudinal members including a rear pillar-forming portion and a rail-forming portion, each of said pillar-forming portions being coupled to an end of a respective one of said lower side rail members and extending upwardly from said respective lower side rail member to define a rearward-most pillar of said motor vehicle, each of said rail-forming portions extending forwardly from said pillar-forming portion to define a roof support rail of said motor vehicle;
a pair of forward pillar structures, each of said forward pillar structures being coupled with a forward portion of a respective one of said lower side rail members and extending upwardly therefrom to form a forward-most pillar of said motor vehicle, an upper end of each forward-most pillar structure being coupled to a respective upper longitudinal member;
a hydroformed intermediate U-shaped cross-member having a cross portion and a pair of leg portions, each leg portion extending from a juncture at each end of said cross portion; and
a pair of pillar support structures, each of said pair of pillar support structures being formed of stamped sheet metal material and being connected to a respective intermediate portion of a respective one of said lower side rail members, each of said leg portions of said intermediate cross member being coupled to a respective one of said pair of pillar support structures and extending upwardly therefrom to form a pair of intermediate pillars of said motor vehicle.

17. A space frame as defined in claim 16, wherein a rearward portion of each lower side rail member curves inwardly to define a rear wheel well, and wherein each of said pillar support structures is located at one of said rear wheel wells.

18. A space frame as defined in claim 16, wherein
each of said forward-most pillars has a lower end connected to said respective lower side rail member and extends upwardly to form said A pillar and forms a portion of a respective front wheel well together with said respective lower side rail member.

19. A space frame as defined in claim 16, wherein each of said pair of lower side rail members is of three piece construction.

20. A space frame as defined in claim 16, wherein each of said pair of forward pillar structures is formed of stamped sheet metal material.

21. A space frame as defined in claim 16, further comprising:
a pair of quarter panel extensions formed of stamped sheet metal material, each of said quarter panel extensions being coupled to a respective one of said leg portions of said U-shaped cross-member.

22. A method of forming a motor vehicle space frame, comprising:
forming each of a pair of hydroformed upper longitudinal members in a respective hydroforming procedure, each upper longitudinal member including a pillar forming portion and a rail forming portion;

forming each of a pair lower side rail members in respective hydroforming procedures;

stamping metal material to form a plurality of components constructed and arranged to be assembled into a pair of forward-most pillar assemblies;

providing an elongated connecting structure; and assembling said components, said hydroformed members and said connecting structure such that (a) the pillar-forming portion of each upper longitudinal member is connected to a respective one of said lower side rail members to form a rearward most pillar thereon, (b) the rail-forming portion of each upper longitudinal member extends forwardly from the associated pillar forming portion thereof to define a roof support rail on a respective side of said motor vehicle, (c) each forward-most pillar assembly is connected between a respective one of said lower side rail members and an associated upper longitudinal member and (d) said connecting structure is connected between said pair of lower side rail members to hold said lower side rail members in laterally spaced relation to one another.

23. A method for forming a motor vehicle space frame as defined in claim 22, wherein each said hydroformed upper longitudinal member includes a forward pillar-forming portion extending from a forward and of the rail-forming portion thereof and wherein each forward-most pillar assembly is connected to the forward pillar-forming portion of the associated upper longitudinal member, each forward-most pillar assembly and the associated forward pillar-forming portion defining an A pillar on a respective side of said motor vehicle.

24. A method for forming a motor vehicle space frame as defined in claim 22, wherein each forward-most pillar assembly is connected to the rail-forming portion of the associated upper longitudinal member, each forward-most pillar assembly defining an A pillar on a respective side of said motor vehicle.

25. A method for forming a motor vehicle space frame as defined in claim 22, wherein forming each upper longitudinal member includes providing an angularly shaped blank having a metallic wall, placing the blank in a die assembly having die surfaces defining a die cavity, providing pressurized fluid into an interior of the blank to expand said wall into conformity with said die surfaces and wherein forming each lower side rail member includes (a) providing a plurality of blanks each having a metallic wall, (b) placing each said blank in a respective die assembly, each die assembly having die surfaces defining a die cavity, (c) providing pressurized fluid into an interior of each said blank to expand said wall into conformity with said die surfaces, each blank of said plurality of blanks of each lower side rail member forming a hydroformed portion of the respective lower side rail member and (d) joining the plurality of hydroformed portions of said lower side rail member.

26. A method of forming a motor vehicle space frame, comprising:

forming a hydroformed cross member in a hydroforming procedure, said cross member including a cross portion and a pair of pillar forming leg portions, each leg portion extending from a juncture at a respective end of the cross portion;

forming each of a pair of hydroformed upper longitudinal members in a respective hydroforming procedure, each upper longitudinal member including a pillar forming portion and a rail forming portion;

forming each of a pair lower side rail members in a respective hydroforming procedure, forward and rearward portions of said lower side rail member defining forward and rearward wheel wells, respectively;

stamping metal material to form a plurality of components constructed and arranged to be assembled into a pair of forward-most pillar assemblies;

stamping metal material to form a plurality of components constructed and arranged to be assembled into a pair of pillar support assemblies;

providing an elongated connecting structure; and assembling said components, said hydroformed members and said connecting structure such that (a) the pillar-forming portion of each upper longitudinal member is connected to a respective one of said lower side rail members to form a rearward most pillar thereon, (b) the rail-forming portion of each upper longitudinal member extends forwardly from the associated pillar forming portion thereof to define a roof support rail on a respective side of said motor vehicle, (c) each forward-most pillar assembly is connected between a respective one of said lower side rail members and an associated upper longitudinal member, (d) each pillar support assembly is connected to a respective lower side rail member adjacent the rear wheel well thereof, (e) each juncture of said cross member is connected to an intermediate portion of the roof rail portion of an associated upper longitudinal member and each leg portion of said intermediate cross member is coupled to a respective one of said pair of pillar support assemblies and extends upwardly therefrom to form an intermediate pillar of said motor vehicle and (f) said connecting structure is connected between said pair of lower side rail members to hold said lower side rail members in laterally spaced relation to one another.

27. A method of forming a motor vehicle space frame as defined in claim 26, wherein forming said cross member includes (a) providing an angularly shaped blank having a metallic wall, (b) placing the blank in a die assembly having die surfaces defining a die cavity and (c) providing pressurized fluid into an interior of the blank to expand said wall into conformity with said die surfaces, wherein forming each said upper longitudinal member includes (a) providing an angularly shaped blank having a metallic wall, (b) placing the blank in a die assembly having die surfaces defining a die cavity and (c) providing pressurized fluid into an interior of the blank to expand said wall into conformity with said die surfaces and wherein forming each lower side rail member includes (a) providing a plurality of blanks each having a metallic wall, (b) placing each said blank in a respective die assembly, each die assembly having die surfaces defining a die cavity, (c) providing pressurized fluid into an interior of each said blank to expand said wall into conformity with said die surfaces, each blank of said plurality of blanks of each lower side rail member forming a hydroformed portion of the respective lower side rail member and (d) joining the plurality of hydroformed portions of said lower side rail member.

* * * * *

UNITED STATES PATENT AND TRADEMARK OFFICE
CERTIFICATE OF CORRECTION

PATENT NO.   : 6,824,204 B2
DATED        : November 30, 2004
INVENTOR(S)  : Gianfranco Gabbianelli It is certified that error appears in the above-identified patent and that said Letters Patent is hereby corrected as shown below:

Title page,
Item [75], Inventors, replace "Gianfranco Gabbianelli, Troy, MI (US)" with
-- Gianfranco Gabbianelli, Troy, MI (CA) --.

Signed and Sealed this

Twenty-fourth Day of May, 2005

JON W. DUDAS
*Director of the United States Patent and Trademark Office*